(12) United States Patent
Matsuzaki et al.

(10) Patent No.: US 10,329,442 B2
(45) Date of Patent: Jun. 25, 2019

(54) AQUEOUS INK COMPOSITION, INK JET RECORDING METHOD, AND INK JET RECORDING APPARATUS

(71) Applicant: Seiko Epson Corporation, Tokyo (JP)

(72) Inventors: Akiko Matsuzaki, Matsumoto (JP); Mitsuaki Kosaka, Minowa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/907,696

(22) Filed: Feb. 28, 2018

(65) Prior Publication Data

US 2018/0273789 A1   Sep. 27, 2018

(30) Foreign Application Priority Data

Mar. 24, 2017 (JP) ................... 2017-058769

(51) Int. Cl.
| | |
|---|---|
| *B41J 2/21* | (2006.01) |
| *B41M 5/00* | (2006.01) |
| *B41M 7/00* | (2006.01) |
| *B41J 11/00* | (2006.01) |
| *B41J 2/165* | (2006.01) |

(Continued)

(52) U.S. Cl.
CPC ............ *C09D 11/38* (2013.01); *B41J 2/165* (2013.01); *B41J 2/1652* (2013.01); *B41J 2/2107* (2013.01); *B41J 2/2114* (2013.01); *B41J 11/002* (2013.01); *B41J 11/0015* (2013.01); *B41M 5/0017* (2013.01); *B41M 5/0023* (2013.01); *C09D 11/033* (2013.01); *C09D 11/107* (2013.01); *C09D 11/12* (2013.01); *C09D 11/36* (2013.01);

(Continued)

(58) Field of Classification Search
CPC ..... C09D 11/38; C09D 11/033; C09D 11/107; C09D 11/36; C09D 11/12; B41J 11/002; B41J 2/2107; B41M 7/009; B41M 5/0017; B41M 5/0023
See application file for complete search history.

(56) References Cited

U.S. PATENT DOCUMENTS

| | | | |
|---|---|---|---|
| 2012/0026239 A1 | 2/2012 | Yanagi | |
| 2012/0232203 A1* | 9/2012 | Tomura | ............... C09D 11/38 524/388 |
| 2016/0319141 A1 | 11/2016 | Sugita et al. | |

FOREIGN PATENT DOCUMENTS

| | | |
|---|---|---|
| JP | 2012-180425 A | 9/2012 |
| JP | 5606818 B2 | 10/2014 |

(Continued)

*Primary Examiner* — Julian D Huffman
(74) *Attorney, Agent, or Firm* — Harness, Dickey & Pierce, P.L.C.

(57) ABSTRACT

There are provided an aqueous ink composition containing a polyolefin wax; a resin dispersion; water; and a surfactant A, in which a content of one kind or more of the surfactants A, which are surfactants having a molecular weight of less than 10,000 and which are selected from the group consisting of an ionic surfactant and a nonionic surfactant, the nonionic surfactant being selected from the group consisting of ethers of polyalkylene oxide, higher aliphatic acid esters, and higher aliphatic amides, is 7 parts by mass or less when a total content of the resin of the resin dispersion and the polyolefin wax is 100 parts by mass, and the aqueous ink composition is used in a recording method including attaching a reaction liquid, which contains an aggregating agent for aggregating components of an aqueous ink composition, to a recording medium.

21 Claims, 1 Drawing Sheet

(51) Int. Cl.
*C09D 11/12* (2006.01)
*C09D 11/36* (2014.01)
*C09D 11/38* (2014.01)
*C09D 11/54* (2014.01)
*C09D 11/033* (2014.01)
*C09D 11/107* (2014.01)

(52) U.S. Cl.
CPC ............. *C09D 11/54* (2013.01); *B41M 7/009* (2013.01); *B41M 7/0018* (2013.01)

(56) References Cited

FOREIGN PATENT DOCUMENTS

JP 5676734 B1 2/2015
JP 2015-199882 A 11/2015

\* cited by examiner

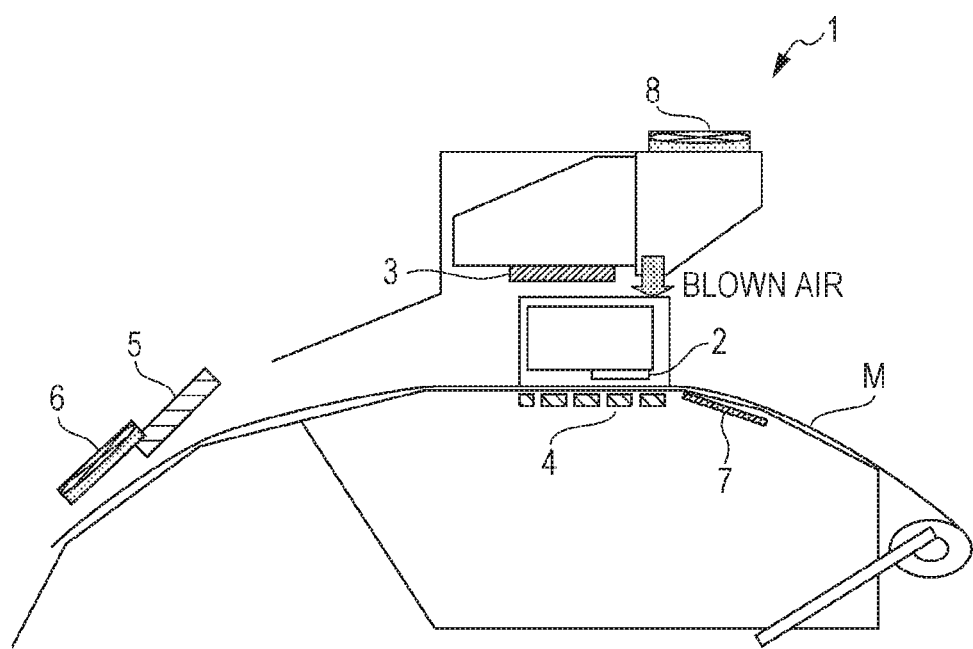

AQUEOUS INK COMPOSITION, INK JET RECORDING METHOD, AND INK JET RECORDING APPARATUS

BACKGROUND

1. Technical Field

The present invention relates to an aqueous ink composition, an ink jet recording method, and an ink jet recording apparatus.

2. Related Art

An ink jet recording method for ejecting minute ink droplets from a nozzle of a recording head of an ink jet recording apparatus to record an image on a recording medium is known and the use thereof in the fields of sign printing and high-speed label printing is also being researched. In a case where an image is recorded on a recording medium with a low ink absorbing property (for example, art paper or coated paper) or a recording medium with an ink non-absorbing property (for example, a plastic film), the use of an aqueous resin ink composition containing resin emulsion (also referred to below as "an aqueous ink" or "an ink") as ink is being researched from the viewpoints of the global environment, safety for human bodies, and the like.

There is known a technique for improving the abrasion resistance of recorded matter, in which wax is incorporated into aqueous inks in addition to fine resin particles as a fixing resin. In recording on a recording medium with a low or non-ink absorbing property using aqueous ink, there is known a technique for recording using a reaction liquid for aggregating ink components in order to quickly fix the ink attached to the recording medium to reduce ink bleeding and to improve image quality (refer to, for example, JP-A-2015-199882).

However, although the reaction liquid is used to quickly fix the ink, there is a problem in that the water resistance and abrasion resistance of the recorded matter are decreased when recording is performed using this reaction liquid. This is presumed to be because, when a reaction liquid is used, the resin of the resin emulsion and the aggregated particles of the wax become sparse in the ink layer of the recorded matter after recording, the surfactant is present in the voids so as to be easily absorbed therein, and the water resistance and the abrasion resistance are deteriorated.

SUMMARY

An advantage of some aspects of the invention is to provide an aqueous ink composition having water resistance and abrasion resistance, an ink jet recording method, and an ink jet recording apparatus, which are capable of obtaining recorded matter excellent in image quality.

The invention can be realized in the following aspects or application examples.

APPLICATION EXAMPLE 1

According to an aspect of the invention, there is provided an aqueous ink composition including a polyolefin wax, a resin dispersion, water, and a surfactant A, in which a content of one kind or more of the surfactants A, which are surfactants having a molecular weight of less than 10,000 and which are selected from the group consisting of an ionic surfactant and a nonionic surfactant, the nonionic surfactant being selected from the group consisting of ethers of polyalkylene oxide, higher aliphatic acid esters, and higher aliphatic amides, is 7 parts by mass or less when a total content of the resin of the resin dispersion and the polyolefin wax is 100 parts by mass, and the aqueous ink composition is used in a recording method including attaching a reaction liquid, which contains an aggregating agent for aggregating components of an aqueous ink composition, to a recording medium.

According to the application example described above, controlling the content of the surfactant A included in the aqueous ink composition to be as small as 7 parts by mass or less with respect to the total of the solid content of the resin of the resin emulsion and the wax makes it possible to provide an aqueous ink composition, in which it is difficult for the surfactant A to be absorbed in the ink layer of the recorded matter, with which the water resistance and abrasion resistance of the recorded matter are improved, and which is able to obtain recorded matter excellent in image quality. This is presumed to be due to the facts that the smaller the amount of the surfactant A is, the better the drying property of the ink coating film becomes, and that the recorded matter is sufficiently dried to form a film.

APPLICATION EXAMPLE 2

In the application example described above, when the total content of the resin of the resin dispersion and the polyolefin wax is 100 parts by mass, the content of the surfactant A may be 0.5 parts by mass or more and 6 parts by mass or less.

According to the application example described above, the content of the surfactant A being 0.5 parts by mass or more and 6 parts by mass or less when the total content of the resin of the resin dispersion and the polyolefin wax is 100 parts by mass further improves the water resistance and abrasion resistance of the recorded matter and makes it possible to obtain recorded matter excellent in image quality.

APPLICATION EXAMPLE 3

In the application example described above, the ionic surfactant and the nonionic surfactant may be included as the surfactant A.

According to the application example described above, including both the ionic surfactant and the nonionic surfactant as the surfactant A further improves the water resistance and abrasion resistance of the recorded matter and makes it possible to obtain recorded matter excellent in image quality.

APPLICATION EXAMPLE 4

In the application example described above, the surfactant A may include at least one kind selected from the group consisting of a carboxylate, an organic sulfonate, an organic sulfate, and an organic phosphate as the ionic surfactant.

According to the application example described above, the surfactant A including at least one kind selected from the group consisting of a carboxylate, an organic sulfonate, an organic sulfate, and an organic phosphate as the ionic surfactant makes it possible to have both reactivity with the reaction liquid and ejection reliability of the ink, further improves the water resistance and abrasion resistance, and makes it possible to obtain recorded matter excellent in image quality.

APPLICATION EXAMPLE 5

In the application example described above, the polyolefin wax may have a melting point of 85° C. or higher and 200° C. or lower.

According to the application example described above, including the polyolefin wax having a melting point of 85° C. or higher and 200° C. or lower further improves the water resistance and abrasion resistance, and makes it possible to obtain recorded matter excellent in image quality.

APPLICATION EXAMPLE 6

In the application example described above, the polyolefin wax may have a mass average particle size of 50 nm or more and 600 nm or less according to a light scattering method.

According to the application example described above, the polyolefin wax having a mass average particle size of 50 nm or more and 600 nm or less according to a light scattering method further improves the water resistance and abrasion resistance, and makes it possible to obtain recorded matter excellent in image quality.

APPLICATION EXAMPLE 7

In the application example described above, the resin of the resin dispersion may be a (meth)acrylic resin.

According to the application example described above, the resin of the resin dispersion being a (meth)acrylic resin further improves the water resistance and abrasion resistance, and makes it possible to obtain recorded matter excellent in image quality.

APPLICATION EXAMPLE 8

In the application example described above, the aqueous ink composition may further include a surfactant other than the surfactant A.

According to the application example described above, even in a case where the aqueous ink composition includes a surfactant other than the surfactant A, the water resistance and abrasion resistance are improved, and it is possible to obtain recorded matter excellent in image quality.

APPLICATION EXAMPLE 9

In the application example described above, a cyclic amide compound may be included as an organic solvent.

According to the application example described above, the aqueous ink composition including a cyclic amide compound as an organic solvent makes it possible to obtain recorded matter with excellent water resistance and abrasion resistance.

APPLICATION EXAMPLE 10

In the application example described above, an absolute value of a difference in surface tension between the aqueous ink composition and the reaction liquid may be 15 mN/m or less.

According to the application example described above, an absolute value of a difference in surface tension between the aqueous ink composition and the reaction liquid being 15 mN/m or less secures wettability at the time of recording, thus it is possible to perform recording excellent in image quality.

APPLICATION EXAMPLE 11

In the application example described above, a content of an organic solvent having a standard boiling point of higher than 280° C. may be 3% by mass or less.

According to the application example described above, the aqueous ink composition having a content of an organic solvent having a standard boiling point of higher than 280° C. of 3% by mass or less increases the drying property of the reaction liquid on the recording medium, improves the water resistance and the abrasion resistance, and makes it possible to obtain recorded matter excellent in image quality.

APPLICATION EXAMPLE 12

In the application example described above, the reaction liquid may be at least one kind selected from the group consisting of a polyvalent metal salt, a cationic compound, and organic acid as an aggregating agent.

According to the application example described above, the aggregating agent being at least one kind selected from the group consisting of a polyvalent metal salt, a cationic compound, and organic acid suppresses the generation of bleeding to improve the water resistance and abrasion resistance and make it possible to obtain recorded matter excellent in image quality.

APPLICATION EXAMPLE 13

In the application example described above, the aqueous ink composition may be used for recording on a recording medium with a low ink absorbing property or a recording medium with an ink non-absorbing property.

According to the application example described above, in a case of a recording medium with an ink non-absorbing property or a low ink absorbing property, the generation of bleeding is suppressed and it is possible to form an image with excellent abrasion resistance.

APPLICATION EXAMPLE 14

According to another aspect of the invention, there is provided an ink jet recording method using the aqueous ink composition according to any one of Application Examples 1 to 13 and a reaction liquid, the method including attaching the reaction liquid to a recording medium, and attaching the aqueous ink composition to the recording medium by an ink jet method.

According to the application example described above, controlling the content of the surfactant A included in the aqueous ink composition to be as small as 7 parts by mass or less with respect to the total of the solid content of the resin of the resin emulsion and the wax makes it possible to provide an ink jet recording method, in which it is difficult for the surfactant A to be absorbed in the ink layer of the recorded matter, with which the water resistance and abrasion resistance of the recorded matter are improved, and which is able to obtain recorded matter excellent in image quality.

APPLICATION EXAMPLE 15

In the application example described above, heating the recording medium may be provided, in which the attaching of the aqueous ink composition is attaching the aqueous ink composition to a recording medium heated in the heating.

According to the application example described above, even in a case where the attaching of the aqueous ink composition is performed on a heated recording medium, the water resistance and abrasion resistance of the recorded matter are improved, it is possible to obtain recorded matter excellent in image quality, and it is also possible to provide an ink jet recording method which has excellent ejection stability.

APPLICATION EXAMPLE 16

In the application example described above, the attaching of the aqueous ink composition may be performed by performing a plurality of scans in which the ink composition is ejected and attached to a recording medium while changing a position of an ink jet head relative to the recording medium, and a time during which the ink jet head faces the recording medium in one scan may be 12 seconds or shorter.

According to the application example described above, it is possible to suppress drying and composition variations of the ink composition in the nozzle, and it is possible to reduce deposition of the resin on the inner wall of the nozzle. As a result, it is possible to suppress landing deviation of the ink at the time of continuous printing, and clogging recoverability of the nozzles is also good.

APPLICATION EXAMPLE 17

According to still another aspect of the invention, there is provided an ink jet recording apparatus including an ink jet head, in which the ink jet recording apparatus performs the ink jet recording method according to any one of Application Examples 14 to 16.

According to the application example described above, controlling the content of the surfactant A included in the aqueous ink composition to be as small as 7 parts by mass or less with respect to the total of the solid content of the resin of the resin emulsion and the wax makes it possible to provide an ink jet recording apparatus, in which it is difficult for the surfactant A to be absorbed in the ink layer of the recorded matter, with which the water resistance and abrasion resistance of the recorded matter are improved, and which is able to obtain recorded matter excellent in image quality.

APPLICATION EXAMPLE 18

In the application example described above, a mechanism for discharging ink from an ink jet head which is not a pressure generating unit that ejects an ink composition provided in an ink jet head to carry out recording may be further provided, in which control may be performed in which the ink jet recording method is performed for one hour or longer without performing cleaning performed using the mechanism.

According to the application example described above, since recording is performed by the ink jet recording method described above, it is possible to realize ink jet recording excellent in ejection stability for one hour or longer without performing cleaning in particular.

BRIEF DESCRIPTION OF THE DRAWINGS

The invention will be described with reference to the accompanying drawings, wherein like numbers reference like elements.

FIGURE is a schematic cross-sectional view schematically showing an ink jet recording apparatus.

DESCRIPTION OF EXEMPLARY EMBODIMENTS

A description will be given below of preferable embodiments of the invention. The embodiments described below explain one example of the invention. In addition, the invention is not limited to the following embodiments, but also includes various modified examples implemented within a scope not changing the gist of the invention.

The aqueous ink composition according to the present embodiment includes a polyolefin wax, a resin dispersion, and water, in which a content of one kind or more of a surfactant A, which is a surfactant having a molecular weight of less than 10,000 and which is selected from the group consisting of an ionic surfactant and a nonionic surfactant, the nonionic surfactant being selected from the group consisting of ethers of polyalkylene oxide, higher aliphatic acid esters, and higher aliphatic amides, is 7 parts by mass or less when a total content of the resin of the resin dispersion and the polyolefin wax is 100 parts by mass, and the aqueous ink composition is used in a recording method including a step of attaching a reaction liquid, which contains an aggregating agent for aggregating components of an aqueous ink composition, to a recording medium.

In addition, the ink jet recording method according to the present embodiment uses the aqueous ink composition according to the present embodiment and a reaction liquid, the method including an ink composition attaching step of attaching the reaction liquid to a recording medium, and a reaction liquid attaching step of attaching the aqueous ink composition to the recording medium by an ink jet method.

Furthermore, the ink jet recording apparatus according to the present embodiment is provided with an ink jet head and performs the ink jet recording method according to the present embodiment.

Below, the aqueous ink composition, the ink jet recording method, and the ink jet recording apparatus according to the present embodiment will be explained with reference to an ink jet recording apparatus, an aqueous ink composition (also referred to below as "aqueous ink" or "ink"), a reaction liquid, a recording medium, and an ink jet recording method, in order.

1. Configurations
1.1. Ink Jet Recording Apparatus

A description will be given of an example of an ink jet recording apparatus according to the present embodiment with reference to the drawings. Here, the ink jet recording apparatus according to the present embodiment is not limited to the following aspect.

FIGURE is a schematic cross-sectional view schematically showing an ink jet recording apparatus. As shown in FIGURE, an ink jet recording apparatus 1 is provided with an ink jet head 2, an IR heater 3, a platen heater 4, a curing heater 5, a cooling fan 6, a preheater 7, and a ventilation fan 8. The ink jet recording apparatus 1 is provided with a control unit (not shown), and the entire operation of the ink jet recording apparatus 1 is controlled by the control unit.

The ink jet head 2 is a unit that ejects and attaching the aqueous ink composition to the recording medium M. As the ink jet head 2, it is possible to use either of a line type ink jet head and a serial type ink jet head.

The ink jet head 2 is provided with a nozzle (not shown) for ejecting an ink composition and a reaction liquid containing an aggregating agent for aggregating components of the ink composition. Examples of a method of ejecting ink from a nozzle include a method (electrostatic suction method) in which a strong electric field is applied between a nozzle and an accelerating electrode placed in front of the nozzle, droplet-shaped ink is continuously ejected from the nozzle, and ink droplets are ejected corresponding to a record information signal while flying between deflection electrodes; a method in which pressure is applied to the ink by a small pump and the nozzle is mechanically vibrated by a crystal oscillator or the like to forcibly eject ink droplets; a method (piezo method) in which pressure is applied to ink by a piezoelectric element at the same time as a recording information signal and the ink droplets are ejected and recorded; a method (thermal jet method) in which ink is heated and foamed by a microelectrode according to a recording information signal and ink droplets are ejected and recorded, and the like.

Here, the ink jet recording apparatus provided with a serial type ink jet head performs recording by performing scanning (passes) for ejecting the ink composition a plurality of times while moving the ink jet head for recording relative to the recording medium. Specific examples of serial type ink jet heads include examples in which an ink jet head is mounted on a carriage which moves in the width direction of the recording medium (direction intersecting the transport direction of the recording medium), and the ink jet head moves in accordance with the movement of the carriage to eject droplets on the recording medium.

On the other hand, an ink jet recording apparatus provided with a line type ink jet head performs recording by performing scanning (passes) for ejecting the ink composition once while moving the ink jet head for recording relative to the recording medium. Specific examples of the line type ink jet head include an example in which the ink jet head is formed to be wider than the width of the recording medium and the recording head ejects droplets on the recording medium without moving.

Here, in the present embodiment, as the ink jet recording apparatus 1, an ink jet recording apparatus provided with a serial type ink jet head is used, and it is possible to use an ink jet head 2 using a piezo method as a method of ejecting ink from a nozzle.

The ink jet recording apparatus 1 is provided with an IR heater 3 and a platen heater 4 for heating the recording medium M at the time of ejecting the ink composition (ink composition attaching step) from the ink jet head 2. In the present embodiment, in the ink composition attaching step, when heating the recording medium M, it is sufficient to use at least one of the IR heater 3 and the platen heater 4.

Using the IR heater 3 makes it possible to heat the recording medium M from the ink jet head 2 side. Due to this, although the ink jet head 2 is also easily heated at the same time, it is possible to raise the temperature without being influenced by the thickness of the recording medium M, as compared with a case where the recording medium M is heated from the rear side, such as with the platen heater 4. In addition, when the platen heater 4 is used when heating the recording medium M, it is possible to heat the recording medium M from the side opposite to the ink jet head 2 side. Due to this, it is relatively difficult for the ink jet head 2 to be heated.

However, the surface temperature of the recording medium M by heating from the IR heater 3 and the platen heater 4 at the time of ink jet recording described below is preferably 50° C. or lower, more preferably 45° C. or lower, even more preferably 40° C. or lower, and yet more preferably 38° C. or lower. Due to this, since radiation heat received from the IR heater 3 and the platen heater 4 is reduced or eliminated, it is possible to suppress drying and composition variations of the ink composition in the ink jet head 2 and fine resin particles, wax, and the like are suppressed from being deposited on the inner wall of the ink jet head 2. Here, the lower limit of the surface temperature of the recording medium M at the time of ink jet recording is preferably 32° C. or higher, more preferably 34° C. or higher, and even more preferably 36° C. or higher. The lower limit of the surface temperature of the recording medium M at the time of ink jet recording being 32° C. or higher makes it possible to quickly dry the ink on the recording medium M, and bleeding is suppressed.

The curing heater 5 is for drying and solidifying the ink composition recorded on the recording medium M (secondary heating step). Using the curing heater 5 to heat the recording medium M on which the image is recorded scatters and evaporates moisture or the like included in the ink composition more quickly to form the ink film using the fine resin particles included in the ink composition. In this manner, the ink film firmly fixes (attaches) to the recording medium M, and it is possible to obtain a high-quality image excellent in abrasion resistance in a short time. The surface temperature of the recording medium M during the heating by the curing heater 5 is preferably 40° C. or higher and 120° C. or lower, more preferably 60° C. or higher and 110° C. or lower, and even more preferably 80° C. or higher and 100° C. or lower.

The ink jet recording apparatus 1 may have a cooling fan 6. After the ink composition recorded on the recording medium M is heated by the curing heater 5 and dried, the ink composition on the recording medium M is cooled by the cooling fan 6, such that it is possible to form an ink film with good adhesion on the recording medium M.

In addition, the ink jet recording apparatus 1 may be provided with the preheater 7 which heats (preheats) the recording medium M in advance before the ink composition is ejected onto the recording medium M. Furthermore, the recording apparatus 1 may be provided with a ventilation fan such that the ink composition attached to the recording medium M is more efficiently dried.

1.2. Aqueous Ink Composition

Next, a description will be given of the aqueous ink composition according to the present embodiment. The aqueous ink composition according to the present embodiment includes a polyolefin wax, a resin dispersion, and water, in which a content of one kind or more of a surfactant A, which is a surfactant having a molecular weight of less than 10,000 and which is selected from the group consisting of an ionic surfactant and a nonionic surfactant, the nonionic surfactant being selected from the group consisting of ethers of polyalkylene oxide, higher aliphatic acid esters, and higher aliphatic amides, is 7 parts by mass or less when a total content of the resin of the resin dispersion and the polyolefin wax is 100 parts by mass, and the aqueous ink composition is used in a recording method including a step of attaching a reaction liquid, which contains an aggregating agent for aggregating components of an aqueous ink composition, to a recording medium.

Using such an aqueous ink composition as an ink set together with a reaction liquid to be described below improves the water resistance and abrasion resistance of the recorded matter and makes it possible to obtain recorded matter excellent in image quality. A detailed description will be given below of components included in and able to be included in the aqueous ink composition according to the present embodiment.

1.2.1. Polyolefin Wax

The aqueous ink composition according to the present embodiment contains a polyolefin wax. In the present embodiment, the aqueous ink composition containing the polyolefin wax improves the water resistance and abrasion resistance of the obtained recorded matter.

The polyolefin wax is not particularly limited, and examples thereof include waxes and copolymers thereof produced from olefins such as ethylene, propylene, and butylene, and derivatives thereof, specifically, polyethylene-based waxes, polypropylene-based waxes, polybutylene-based waxes, and the like. Among these, polyethylene-based wax is preferable from the viewpoint that it is possible to more effectively reduce the generation of cracks in images. It is possible to use the polyolefin wax alone or in a combination of two or more kinds.

The polyolefin wax is used in the state of a polyolefin wax emulsion in which solid wax particles are dispersed in water by a surfactant A to be described below.

As a polyolefin wax emulsion, examples of methods for producing a polyethylene wax emulsion include polymerizing ethylene to produce a polyethylene wax, synthesizing a polyethylene wax from a hydrocarbon compound, or lowering the molecular weight of polyethylene for general molding by thermal decomposition to produce a polyethylene wax. Then, this polyethylene wax is oxidized, a carboxyl group or a hydroxyl group is added, the resultant is further emulsified using a surfactant to obtain a polyethylene wax emulsion in a state of an aqueous wax emulsion with excellent stability.

Commercial products of polyolefin wax include the Chemipearl series such as "Chemipearl W 4005" (polyethylene-based wax, particle size 200 nm or more and 800 nm or less, softening point measured by a ring and ball method 110° C., hardness measured by penetration method 3, and solid content 40%, manufactured by Mitsui Chemicals, Inc.). Other examples include the AQUACER series such as AQUACER 513 (polyethylene-based wax, particle size of 100 or more and 200 nm or less, melting point 130° C., solid content 30%), AQUACER 497, AQUACER 513, and AQUACER 517 (the above are manufactured by BYK Additives & Instruments), the High Tec Series such as High Tec E-7025P, High Tec E-2213, High Tec E-9460, High Tec E-9015, High Tec E-4A, High Tec E-5403P, and High Tec E-8237 (the above are manufactured by TOHO Chemical Industry Co., Ltd.), NOPCOAT PEM-17 (polyethylene emulsion, particle size 40 nm, manufactured by San Nopco Ltd.), and the like. The above are commercially available in the form of an aqueous emulsion in which polyolefin wax is dispersed in water by a typical method and are able to be directly added to the ink composition while still in the form of an aqueous emulsion.

The upper limit of the average particle size of the polyolefin wax is preferably 600 nm or less, more preferably 500 nm or less, and even more preferably 450 nm or less. The lower limit of the average particle size of the polyolefin wax is preferably 50 nm or more, more preferably nm or more, even more preferably 200 nm or more, and particularly preferably 300 nm or more. The average particle size of the polyolefin wax being within the above range reduces the generation of cracking in formed images, further improves the water resistance and abrasion resistance, and also makes it possible to improve glossiness. In addition, it is possible to achieve ejection stability in the ink jet head and both performances of water resistance and abrasion resistance in the formed image.

Here, it is possible to measure the average particle size of the wax described above as a mass average by a particle size distribution measuring apparatus using a light scattering method (laser diffraction scattering method) as a measurement principle. As the particle size distribution measuring apparatus, for example, it is possible to use a particle size distribution meter (for example, "Microtrac UPA" manufactured by Nikkiso Co., Ltd.) using the dynamic light scattering method as a measurement principle.

In the present embodiment, the melting point of the polyolefin wax is preferably 80° C. or higher and 150° C. or lower, and more preferably 85° C. or higher and 135° C. or lower. Including a polyolefin wax having a melting point of 80° C. or higher and 150° C. or lower further improves the water resistance and abrasion resistance and makes it possible to obtain recorded matter excellent in image quality.

It is possible to adjust the melting point of the polyolefin wax by changing the molecular weight and kind of the components of the polyolefin wax. In addition, in a case of using a mixture of two kinds of polyolefin wax as the polyolefin wax, two kinds of wax emulsion liquids may be mixed into a mixed wax emulsion or an emulsion formed of wax fine particles formed of two kinds of wax may be prepared.

In addition, the content of the polyolefin wax is preferably 0.1% by mass or more and 10% by mass or less with respect to the total mass (100% by mass) of the aqueous ink composition in terms of solid content, more preferably 0.2% by mass or more and 5.0% by mass or less, and more preferably 0.3% by mass or more and 4.0% by mass or less. In a case where the content of the polyolefin wax is within the above range, the effects described above are sufficiently exhibited.

In the present embodiment, in addition to the polyolefin wax included in the aqueous ink composition, for example, paraffin wax and a wax other than paraffin wax may be further included.

Paraffin wax is a so-called petroleum-based wax. Here, paraffin means an alkane having 20 or more carbon atoms (a chain saturated hydrocarbon having a General Formula of $C_nH_{2n+2}$), and in the present embodiment, the paraffin wax means a mixture having linear paraffin-based hydrocarbons (normal-paraffin) having 20 to 30 carbon atoms as the main component and hydrocarbons having a molecular weight of approximately 300 to 500 including a small amount of iso-paraffin. Including the paraffin wax in the aqueous ink composition imparts a slipping property to the recorded matter, thereby improving the abrasion resistance. In addition, since the paraffin wax has water repellency, it is possible to improve the water resistance of the recorded matter if the amount thereof is sufficient.

In the present embodiment, the paraffin wax is preferably contained in a fine particle state (that is, an emulsion state or a suspension state). Containing the paraffin wax in the state of fine particles makes it easier to adjust the viscosity of the aqueous ink composition to an appropriate range for ejection using an ink jet head, and easier to secure storage stability and ejection stability of the ink.

In a case where the paraffin wax is in a fine particle state, the average particle size thereof is preferably 5 nm or more and 600 nm or less, and more preferably 50 nm or more and 400 nm or less from the viewpoint of securing the storage stability and ejection stability of the aqueous ink composition.

As the paraffin wax, it is possible to use commercially available products unchanged, for example, AQUACER 537, AQUACER 539 (the above are trade names, manufactured by BYK Additives & Instruments), and the like.

On the other hand, wax other than paraffin wax has a function of improving abrasion resistance by imparting a slipping property to the surface of the formed recorded matter in the same manner as paraffin wax. The wax other than the paraffin wax is preferably contained in the aqueous ink composition in a fine particle state (that is, an emulsion state or a suspension state). Due to this, the viscosity of the ink is adjusted so as to be in a proper range by ejection using the ink jet head, and it is easy to secure the storage stability and ejection stability of the ink.

As the components forming the wax other than the paraffin wax, it is possible to use plant or animal-based waxes such as carnauba wax, candelilla wax, beeswax, rice wax, and lanolin; mineral waxes such as microcrystalline wax, montan wax, and ozokerite; synthetic waxes such as carbon wax, Hoechst wax, and stearic acid amide; natural and synthetic wax emulsions such as α-olefin-maleic anhydride copolymer, compounded wax, and the like alone or in a combination of a plurality of kinds.

1.2.2. Resin Dispersion

The aqueous ink composition according to the present embodiment contains a water-soluble and/or water-insoluble resin dispersion together with the polyolefin wax described above. The resin dispersion forms a resin film together with the wax to fix the recorded matter on the recording medium and exhibits an effect of improving the water resistance and abrasion resistance. Therefore, the resin dispersion is preferably fine thermoplastic resin particles. Due to this effect, the recorded matter recorded with the aqueous ink composition containing the resin dispersion is excellent in water resistance and abrasion resistance on a recording medium with an ink non-absorbing property or a low ink absorbing property.

The resin is contained in an aqueous ink composition in a resin dispersion (that is, an emulsion state or a suspension state). Containing the resin in the state of a resin dispersion makes it easier to adjust the viscosity of the aqueous ink composition to an appropriate range by ejection using an ink jet head, and easier to secure the storage stability and ejection stability of the ink.

Examples of the resin component of the above resin dispersion include polyacrylic acid ester or a copolymer thereof, polymethacrylic acid ester or copolymer thereof, polyacrylonitrile or a copolymer thereof, polycyanoacrylate, polyacrylamide, polyacrylic acid, polymethacrylic acid, polyethylene, polypropylene, polybutene, polyisobutylene, polystyrene or a copolymer thereof, petroleum resin, chromane-indene resin, terpene resin, polyvinyl acetate or a copolymer thereof, polyvinyl alcohol, polyvinyl acetal, polyvinyl ether, polyvinyl chloride or a copolymer thereof, polyvinylidene chloride, fluororesin, fluororubber, polyvinyl carbazole, polyvinyl pyrrolidone or a copolymer thereof, polyvinyl pyridine, polyvinyl imidazoles, polybutadiene or a copolymer thereof, polychloroprene, polyisoprene, natural resins, and the like. Among these, particularly preferable examples include (meth)acrylic acid, (meth)acrylic esters, acrylonitrile, cyanoacrylate, acrylamide, olefins, styrenes, vinyl acetate, vinyl chloride, vinyl alcohol, vinyl ether, vinyl pyrrolidone, vinyl pyridine, vinyl carbazole, vinyl imidazole, homopolymers or copolymers of vinylidene chloride, fluororesins, and natural resins. Among these, polymers of (meth)acrylic monomers which are any one of a (meth) acrylic acid, (meth)acrylate, acrylonitrile, acrylamide, or the like, and (meth)acrylic resins formed of copolymers of (meth)acrylic monomers and other monomers are preferable. Examples of other monomers include vinyl-(meth) acrylic resins which are copolymers with vinyl monomers. For example, a styrene-(meth)acrylic resin using styrene as a vinyl monomer is preferable. The copolymer described above may be in any form of a random copolymer, a block copolymer, an alternating copolymer, and a graft copolymer. As the resin, it is also possible to preferably use polyurethane-based resins, polyether-based resins, and polyester-based resins.

It is possible to obtain the resin dispersion by the following methods, any of these methods may be used, and a plurality of methods may be combined as necessary. Examples of the method include a method in which a polymerization catalyst (polymerization initiator) and a dispersant are mixed in a monomer forming a desired resin component and polymerized (that is, emulsion polymerization), a method in which a resin component having a hydrophilic portion is dissolved in a water-soluble organic solvent and the water-soluble organic solvent is removed by distillation or the like after mixing the solution in water, a method in which the resin component is dissolved in a water-insoluble organic solvent and this solution is mixed with a dispersant in an aqueous solution, and the like. It is possible to appropriately select the methods described above depending on the kind and characteristics of the resin component to be used. The dispersants which are able to be used when dispersing the resin component are not particularly limited, examples thereof include anionic surfactants (for example, sodium dodecylbenzenesulfonate, sodium lauryl phosphate, polyoxyethylene alkyl ether sulfate ammonium, and the like), nonionic surfactants (for example, polyoxyethylene alkyl ethers, polyoxyethylene alkyl esters, polyoxyethylene sorbitan fatty acid esters, polyoxyethylene alkyl phenyl ethers, and the like), and it is possible to use the above alone or in a combination of two or more kinds.

As the resin dispersion as described above, it is also possible to use resin dispersions able to be obtained with known materials and methods. For example, the resin dispersions described in JP-B-62-1426, JP-A-3-56573, JP-A-3-79678, JP-A-3-160068, JP-A-4-18462, and the like may be used. In addition, it is also possible to use commercially available products and examples thereof include Microgel E-1002, Microgel E-5002 (the above are trade names, manufactured by Nippon Paint Co., Ltd.), Boncoat 4001, Boncoat 5454 (the above are trade names, manufactured by DIC Corporation), SAE 1014 (trade name, manufactured by Zeon Corporation), Cybinol SK-200 (trade name, manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, Joncryl 7610 (the above are trade names, manufactured by BASF Japan Ltd.), and the like.

From the viewpoint of securing the storage stability and ejection stability of the ink composition, the average particle size of the resin of the resin dispersion is preferably in a range of 5 nm or more and 400 nm or less, and more preferably in a range of 50 nm or more and 300 nm or less. The average particle size of the fine resin particles being within the above range makes the film forming properties excellent and makes it possible to reduce clogging of the nozzle since large lumps are not easily formed even when aggregated. It is possible to measure the average particle size in the same manner as the average particle size of the wax.

The content of the resin in the resin dispersion is preferably 0.1% by mass or more and 15% by mass or less with respect to the total mass (100% by mass) of the ink in terms of solid content, more preferably 0.5% by mass or more and 13% by mass or less, even more preferably 2% by mass or more and 11% by mass or less, and particularly preferably 3% by mass or more and 10% by mass or less. Within this range, it is possible to solidify and fix the ink even on a recording medium with an ink non-absorbing property or a low ink absorbing property.

1.2.3. Water

The aqueous ink composition according to the present embodiment contains water. Water is the main medium of the aqueous ink composition, and is a component which is evaporated and scattered by heating. The water is preferably water obtained by removing ionic impurities as much as possible such as pure water or ultrapure water such as ion-exchanged water, ultrafiltered water, reverse osmosis water, distilled water, or the like. In addition, when water sterilized by ultraviolet ray irradiation, the addition of hydrogen peroxide, or the like is used, it is possible to suppress the generation of mold and bacteria in a case where the pigment dispersion liquid and the ink composition using the same are stored for a long time, which is preferable.

The content of water is preferably 50% by mass or more with respect to the total mass (100% by mass) of the aqueous ink composition, more preferably 55% by mass or more, and particularly preferably 60% by mass or more.

1.2.4. Coloring Material

The aqueous ink composition according to the present embodiment may contain a coloring material. Examples of coloring materials include dyes, pigments, and the like, and it is preferable to use a pigment since pigments have a property of being resistant to discoloration due to light, gas, and the like. Therefore, recorded matter formed on a recording medium with an ink non-absorbing property or a low ink absorbing property using a pigment is not only excellent in image quality but also excellent in water resistance, gas resistance, light resistance, and the like and the storability thereof is good.

The pigments usable in the present embodiment are not particularly limited, and examples thereof include inorganic pigments and organic pigments. As the inorganic pigment, in addition to titanium oxide and iron oxide, it is possible to use carbon black produced by a known method such as a contact method, a furnace method, a thermal method, or the like. On the other hand, as the organic pigment, it is possible to use azo pigments (including azo lake, insoluble azo pigments, condensed azo pigments, chelate azo pigments, and the like), polycyclic pigments (for example, phthalocyanine pigments, perylene pigments, perinone pigments, anthraquinone pigments, quinophthalone pigments, and the like), nitro pigments, nitroso pigments, aniline black, and the like.

Among specific examples of pigments usable in the present embodiment, carbon black is an example of a black pigment, and the carbon black is not particularly limited, and examples thereof include furnace black, lamp black, acetylene black, channel black, or the like (C.I. Pigment Black 7), and examples of commercial products include No. 2300, 900, MCF 88, No. 20B, No. 33, No. 40, No. 45, No. 52, MA 7, MA 8, MA 77, MA 100, No. 2200B, and the like (the above are trade names manufactured by Mitsubishi Chemical Corporation), Color black FW 1, FW 2, FW 2 V, FW 18, FW 200, S 150, S 160, S 170, PRETEX 35, U, V, 140 U, special black 6, 5, 4A, 4, 250, and the like (the above are trade names manufactured by Evonik Japan), Conductex SC, Raven 1255, 5750, 5250, 5000, 3500, 1255, 700, and the like (the above are trade names manufactured by Columbia Carbon), and Regal 400R, 330R, 660R, Mogul L, Monarch 700, 800, 880, 900, 1000, 1100, 1300, 1400, ElfTech 12, and the like (the above are trade names manufactured by Cabot Japan KK).

The white pigment is not particularly limited, and examples thereof include white inorganic pigments of C.I. Pigment White 6, 18, 21, titanium oxide, zinc oxide, zinc sulfide, antimony oxide, magnesium oxide, and zirconium oxide. In addition to the white inorganic pigment, it is also possible to use white organic pigments such as white hollow fine resin particles and polymer particles.

The pigment used for the yellow ink is not particularly limited, and examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used for the magenta ink is not particularly limited, and examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245 or C.I. Pigment Violet 19, 23, 32, 33, 36, 38, 43, and 50.

The pigment used for the cyan ink is not particularly limited, and examples thereof include C.I. Pigment Blue 1, 2, 3, 15, 15:1, 15:2, 15:3, 15:34, 15:4, 16, 18, 22, 25, 60, 65, 66; C.I. Vat Blue 4, and 60.

In addition, pigments used for color inks other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

The pearl pigment is not particularly limited, and examples thereof include pigments having pearly luster and interference gloss such as titanium dioxide-coated mica, fish scale foil, and bismuth oxychloride.

Examples of metallic pigments are not particularly limited, and examples thereof include particles formed of a single substance such as aluminum, silver, gold, platinum, nickel, chromium, tin, zinc, indium, titanium, and copper, or an alloy.

The content of the coloring material included in the ink composition is preferably 1.5% by mass or more and 10% by mass or less with respect to the total mass (100% by mass) of the aqueous ink composition, and more preferably 2% by mass or more and 7% by mass or less.

In order to apply the pigment described above to the aqueous ink composition, it is necessary to stably disperse and hold the pigment in water. Examples of the method include a method of dispersing with a resin dispersant such as a water-soluble resin and/or a water-dispersible resin (the pigment dispersed by this method is referred to below as a "resin-dispersed pigment"), a method of dispersing with a surfactant of a water-soluble surfactant and/or a water-dispersible surfactant (a pigment dispersed by this method is referred to below as a "surfactant-dispersed pigment"), a method in which a hydrophilic functional group is chemically and physically introduced to the surface of the pigment particle so as to be able to be dispersed and/or dissolved in water without a dispersant such as the resin or the surfactant (a pigment dispersed by this method is referred to below as a "surface-treated pigment"), and the like. In the present embodiment, it is possible to use any one of a resin-dispersed pigment, a surfactant-dispersed pigment, and a surface-treated pigment as the ink composition, and it is also possible to use a mixture of a plurality of kinds thereof as necessary.

Examples of the resin dispersant used in the resin-dispersed pigment include polyvinyl alcohols, polyvinyl pyrrolidones, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymer, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acryl acid copolymers, and the like and salts thereof. Among these, in particular, a copolymer of a monomer having a hydrophobic functional group and a monomer having a hydrophilic functional group, and a polymer formed of a monomer having both a hydrophobic functional group and a hydrophilic functional group are preferable. As the form of the copolymer, it is possible to use any of a random copolymer, a block copolymer, an alternating copolymer, and a graft copolymer.

Examples of salts include salts of basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine. The addition amount of these basic compounds is not particularly limited as long as the addition amount is the neutralization equivalent or more of the resin dispersant.

The molecular weight of the resin dispersant is preferably in the range of 1,000 to 100,000 as the weight average molecular weight, and more preferably in the range of 3,000 to 10,000. By the molecular weight being within the above range, a stable dispersion of the coloring material in water is obtained, and viscosity control and the like at the time of application to the ink composition are easy.

It is also possible to use commercial products as the resin dispersant described above. Specific examples thereof include Joncryl 67 (weight average molecular weight: 12,500, acid value: 213), Joncryl 678 (weight average molecular weight: 8,500, acid value: 215), Joncryl 586 (weight average molecular weight: 4,600, acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), Joncryl 690 (weight average molecular weight: 16,500, acid value: 240) (the above are trade names manufactured by BASF Japan Ltd.), and the like.

In addition, examples of the surfactant used for the surfactant-dispersed pigment include anionic surfactants such as alkane sulfonate, α-olefin sulfonate, alkylbenzene sulfonate, alkyl naphthalene sulfonate, acyl methyl taurate, dialkyl sulfosuccinate, alkylsulfuric acid ester salts, sulfated olefins, polyoxyethylene alkyl ether sulfuric acid ester salts, alkylphosphoric acid ester salts, polyoxyethylene alkyl ether phosphoric acid ester salts, and monoglyceride phosphoric acid ester salts, amphoteric surfactants such as alkylpyridinium salts, alkylamino acid salts, and alkyl dimethyl betaine, and nonionic surfactants such as polyoxyethylene alkyl ether, polyoxyethylene alkyl phenyl ether, polyoxyethylene alkyl ester, polyoxyethylene alkylamide, glycerin alkyl esters, and sorbitan alkyl esters.

The addition amount of the resin dispersant or the surfactant to the pigment is preferably 1 part by mass to 100 parts by mass with respect to 100 parts by mass of the pigment, and more preferably 5 parts by mass to 50 parts by mass. Within this range, it is possible to secure the dispersion stability of the pigment in water.

In addition, examples of surface-treated pigments include, as a hydrophilic functional group, —OM, —COOM, —CO—, —$SO_3M$, —$SO_2NH_3$, —$RSO_3M$, —$PO_3HM$, —$PO_3M_3$, —$SO_3NHCOR$, —$NH_3$, —$NR_3$ (here, M in the formula represents a hydrogen atom, an alkali metal, ammonium, or organic ammonium, and R indicates an alkyl group having 1 to 12 carbon atoms, a phenyl group which may have a substituent, or a naphthyl group which may have a substituent), and the like. These functional groups are physically and/or chemically introduced by grafting directly and/or via other groups on the pigment particle surface. Examples of polyvalent groups include an alkylene group having 1 to 12 carbon atoms, a phenylene group which may have a substituent, a naphthylene group which may have a substituent, and the like.

In addition, as the surface-treated pigment, a pigment is preferable which is surface treated such that —$SO_3M$ and/or —$RSO_3M$ (M is a counter ion and is a hydrogen ion, alkali metal ion, ammonium ion, or organic ammonium ion) is chemically bonded to the pigment particle surface using a treating agent including sulfur, that is, a pigment is preferable which is dispersed in a solvent which does not have active protons, which has no reactivity with sulfonic acid, and in which the pigment is insoluble or poorly soluble, and which is then subjected to a surface treatment such that —$SO_3M$ and/or —$RSO_3M$ is chemically bonded to the particle surface with amidosulfuric acid or a complex of sulfur trioxide and a tertiary amine such that the pigment is dispersed and/or dissolvable in water.

As a surface treatment unit for grafting the functional group or a salt thereof onto the surface of the pigment particle directly or via a polyvalent group, it is possible to apply various known surface treatment units. Examples of the units include a unit for applying ozone or a sodium hypochlorite solution to commercially available oxidized carbon black and subjecting the carbon black to a further oxidization treatment to further hydrophilize the surface thereof (for example, JP-A-7-258578, JP-A-8-3498, JP-A-10-120958, JP-A-10-195331, and JP-A-10-237349), a unit for treating carbon black with 3-amino-N-alkyl substituted pyridium bromide (for example, JP-A-10-195360 and JP-A-10-330665), a unit for dispersing an organic pigment in a solvent in which the organic pigment is insoluble or hardly soluble, and introducing a sulfone group onto the surface of the pigment particle using a sulfonating agent (for example, JP-A-8-283596, JP-A-10-110110, and JP-A-10-110111), a unit for dispersing an organic pigment in a basic solvent which forms a complex with sulfur trioxide, treating the surface of an organic pigment by adding sulfur trioxide, and introducing a sulfone group or a sulfonamino group (for example, JP-A-10-110114), and the like; however, the unit for preparing the surface-treated pigment used in the invention is not limited to these units.

The number of functional groups grafted to one pigment particle may be one or a plurality. The kind and degree of the functional group to be grafted may be appropriately determined in consideration of the dispersion stability in the ink, the color density, the drying property on the front face of the ink jet head, and the like.

As a method of dispersing the resin-dispersed pigment, the surfactant-dispersed pigment, and the surface treated pigment in water, a pigment, water, and a resin dispersant are added for the resin-dispersed pigment, a pigment, water, and a surfactant are added for the surfactant-dispersed pigment, a surface-treated pigment and water are added for the surface-treated pigment, and a water-soluble organic solvent/neutralizing agent and the like are added to each as necessary, and it is possible to carry out the method in a dispersing machine used in the related art such as a ball mill, a sand mill, an attritor, a roll mill, an agitator mill, a Henschel mixer, a colloid mill, an ultrasonic homogenizer, a jet mill, an Angmill, or the like. In such a case, regarding the particle size of the pigment, the dispersion is performed with an average particle size of 20 nm or more and 500 nm or less and more preferably 50 nm or more and 200 nm or less, which is preferable from the viewpoint of securing the dispersion stability of the pigment in water.

1.2.5. Organic Solvent

The aqueous ink composition according to the present embodiment may contain an organic solvent. The ink composition containing an organic solvent gives the aqueous ink composition ejected onto the recording medium a good drying property and makes it possible to obtain recorded matter excellent in image quality and which is excellent in water resistance and abrasion resistance.

The organic solvent used for the ink composition is preferably a water-soluble organic solvent. Using the water-soluble organic solvent further improves the drying property of the ink composition and makes it possible to obtain recorded matter excellent in water resistance and abrasion resistance.

Examples of organic solvents are not particularly limited, and examples thereof include alcohols such as methanol, ethanol, and isopropyl alcohol; ketones or ketoalcohols such as acetone and diacetone alcohol; ethers such as tetrahydrofuran and dioxane; glycols such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether, and diethylene glycol monobutyl ether; amines having a hydroxyl group such as diethanolamine and triethanolamine; and glycerin. Among these, propylene glycol, 1,2-hexanediol, 1,3-butanediol, and the like are preferably used from the viewpoint of improving the drying property of the aqueous ink composition.

The content of the organic solvent is preferably 2.0% by mass or more and 40% by mass or less with respect to the total mass (100% by mass) of the aqueous ink composition, more preferably 4.0% by mass or more and 35% by mass or less, and particularly preferably 6.0% by mass or more and 30% by mass or less.

In addition, in the present embodiment, the organic solvent used in the aqueous ink composition preferably includes a cyclic amide compound from the viewpoint of obtaining recorded matter excellent in water resistance and abrasion resistance. In more detail, examples of cyclic amide compounds include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. The cyclic amide compound acts as a good dissolving agent for the thermoplastic resin.

The standard boiling point of the organic solvent is preferably 180° C. or higher, more preferably 200° C. or higher, and even more preferably 220° C. or higher. The upper limit thereof is preferably 300° C. or lower, more preferably 270° C. or lower, and even more preferably 250° C. or lower. In a case where the standard boiling point of the organic solvent is in the above range, it is preferable in that the ejection reliability, abrasion resistance, water resistance and the like are further improved.

Here, an organic solvent having a standard boiling point of 280° C. or higher may absorb moisture of the ink to increase the viscosity of the ink near the ink jet head, which may lower the ejection stability of the ink jet head. For this reason, in the aqueous ink composition in the present embodiment, the content of the organic solvent having a standard boiling point of 280° C. or higher is preferably 3% by mass or less, more preferably 2% by mass or less, even more preferably 1% by mass or less, and yet more preferably 0.5% by mass or less. In such a case, since the drying property of the ink composition on the recording medium becomes high, it is possible to form an excellent image in which the generation of bleeding is suppressed. In addition, the stickiness of the obtained recorded matter is reduced, and water resistance and abrasion resistance are excellent.

Examples of an organic solvent having a standard boiling point of 280° C. or higher include glycerin. Glycerin has high hygroscopicity and a high standard boiling point, which may cause clogging and malfunctioning of the ink jet head. In addition, glycerin is poor in antiseptic properties and allows fungi and bacteria to easily propagate, thus, it is preferable that glycerin not be contained in the ink composition.

1.2.6. Surfactant A

Surfactants A are surfactants having a molecular weight of less than 10,000 and which are selected from the group consisting of an ionic surfactant and a nonionic surfactant, the nonionic surfactant being selected from the group consisting of ethers of polyalkylene oxide, higher aliphatic acid esters, and higher aliphatic amides, The aqueous ink composition according to the present embodiment contains surfactant A. The surfactant A is not limited and may be, for example, a surfactant used as an emulsifier for bringing the polyolefin wax or resin described above into a dispersion (emulsion) state. Surfactant A is a predetermined ionic surfactant or nonionic surfactant having a molecular weight of less than 10,000. In addition, the surfactant may also be used in order to disperse components other than the polyolefin and the resin dispersion included in the ink, and may be used for purposes other than dispersion, for example, for adjustment of the surface tension of the ink, for storage stability of the ink, and the like.

It is possible to obtain the molecular weight of the surfactant as a mass average molecular weight by measuring using polystyrene as a standard polymer using a gel permeation chromatography (GPC) measuring apparatus. In addition, for surfactants for which it is possible to specify a chemical structural formula, it is possible to determine the molecular weight by calculation.

The upper limit of the molecular weight of the surfactant A is preferably 7000 or less, more preferably 5000 or less, even more preferably 3000 or less, and yet more preferably 1000 or less. The lower limit of the molecular weight of the surfactant A is preferably 100 or more, more preferably 200 or more, and even more preferably 300 or more. The molecular weight of the surfactant A being less than 10,000 gives the surfactant A high affinity with the polyolefin wax and the resin component, thus, it is possible for the surfactant to enter inside of coating film formed after recording, and, in the ink layer of the recorded matter after recording, the resin of the resin dispersion and the aggregated particles of the wax become sparse. For this reason, it is presumed that it is possible to have both the reactivity with the reaction liquid and the ejection reliability of the ink, to further improve the water resistance and abrasion resistance, and to obtain recorded matter excellent in image quality.

As the surfactant A, the ionic surfactant having a molecular weight of less than 10,000 is not particularly limited as long as the molecular weight is less than 10,000, and it is possible to use a cationic surfactant, an anionic surfactant, or an amphoteric surfactant.

Examples of cationic surfactants include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salts, imidazolinium salts, and the like. Specific examples of cationic surfactants include hydrochlorides such as laurylamine, Coco amine, and rosinamine, acetates, and the like, lauryltrimethylammonium chloride, cetyltrimethylammonium chloride, benzyltributylammonium chloride, benzalkonium chloride, dimethylethyl lauryl ammonium chloride ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

Examples of anionic surfactants include higher fatty acid salts, soaps, α-sulfo fatty acid methyl ester salts, linear alkylbenzene sulfonate salts, alkyl sulfate ester salts, alkyl ether sulfate ester salts, monoalkyl phosphate ester salts, α-olefin sulfonate, alkylbenzene sulfonate, alkyl naphthalene sulfonate, naphthalene sulfonate, alkane sulfonate, polyoxyethylene alkyl ether sulfate, sulfosuccinate, polyoxyalkylene glycol alkyl ether phosphate ester salt, and the like.

Examples of amphoteric surfactants include an alkyl amino fatty acid salt as an amino acid-based surfactant, an alkyl carboxyl betaine as a betaine-based surfactant, an alkyl amine oxide as an amine oxide-based surfactant, and the like.

Among the ionic surfactants described above, it is preferable to use a carboxylate, an organic sulfonate, an organic sulfate, or an organic phosphate as the surfactant A. The organic sulfate may be an organic sulfate ester salt. Among the ionic surfactants, anionic surfactants are preferable.

Salts such as carboxylate, organic sulfonate, organic sulfate, and organic phosphate may be salts with positive ions, but metal salts such as sodium salt, potassium salt, and calcium salt, ammonium salts, or the like are preferable. The metal salt is preferably a salt of an alkali metal or an alkaline earth metal.

Preferable examples of the carboxylate, the organic sulfonate, the organic sulfate, and the organic phosphate include carboxylic acid, organic sulfonic acid, organic sulfuric acid, organic phosphoric acid, and salts thereof, which have aliphatic groups and/or aromatic groups. For aliphatic, a higher fatty acid is preferable. Aliphatic or higher aliphatic refers to those described below.

Examples of the nonionic surfactant having a molecular weight of less than 10,000 include ethers of polyalkylene oxide, higher aliphatic acid esters, and higher aliphatic amides.

Here, higher means 9 or more carbon atoms, preferably 9 or more and 30 or less carbon atoms, and more preferably 12 or more and 20 or less carbon atoms. In addition, aliphatic means nonaromatic and includes chain aliphatic and cycloaliphatic. In the case of chain aliphatic, carbon-carbon double bonds may be included, but triple bonds are not included.

Ethers of polyalkylene oxide are ethers in which an aliphatic group, an aryl group, or the like is ether bonded to the ether oxygen at a terminal of the polyalkylene oxide skeleton. The polyalkylene oxide is an oxide in which an alkylene oxide is repeatedly formed by an ether bond. Examples of polyalkylene oxide include polyethylene oxide, polypropylene oxide, combinations thereof, and the like and, in a case of use in a combination, the order of arrangement thereof is not limited and may be random. The number of repeating alkylene oxides n is not limited, but is preferably, for example, 5 to 50, and more preferably 10 to 40. The polyalkylene oxide skeleton is, for example, represented by the following General Formula.

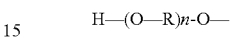

H—(O—R)n-O—

(Here, R represents an alkylene group. n represents an integer of 2 or more.) The aliphatic group is preferably a higher aliphatic group. Higher and aliphatic are as defined above. Examples of aryl groups include a phenyl group, a polycyclic aryl group such as a naphthyl group, or the like. The aliphatic group or the aryl group may be substituted with a functional group such as a hydroxyl group or an ester group. The alkyl group may have a branched structure and, in particular, may have a branched structure starting from a carbon atom directly bonded to the ether oxygen at the terminal of the skeleton of the polyalkylene oxide. In addition, the ethers of the polyalkylene oxide may be a compound having a plurality of polyalkylene oxide skeletons in the molecule, and the number of polyalkylene oxide skeletons in the molecule is preferably 1 to 3.

Examples of the ethers of polyalkylene oxide include polyoxyethylene alkyl ether, polyoxyethylene alkyl phenyl ether, polyoxyethylene alkyl glucoside, polyoxyalkylene glycol alkyl ether, polyoxyalkylene glycol ether, polyoxyalkylene glycol alkyl phenyl ether, and the like.

Higher aliphatic acid esters are esters of higher aliphatic acid. Higher aliphatic is as defined above and may be substituted with, for example, a hydroxyl group or other functional group, and may have a branched structure. The structure of the ester portion of the higher aliphatic acid esters may be a cyclic or chain organic group and the number of carbon atoms is not limited but is preferably 1 to 30, more preferably 2 to 20, and even more preferably 3 to 10. The higher aliphatic acid esters may be of a complex type having a polyalkylene oxide skeleton.

Examples of higher aliphatic acid esters include sucrose fatty acid esters, polyoxyethylene fatty acid esters, polyoxyethylene sorbitan fatty acid esters, sorbitan fatty acid esters, polyoxyalkylene acetylene glycols, and the like.

Higher aliphatic amides are a higher aliphatic amide. Higher aliphatic is as defined above, and may be substituted with, for example, a hydroxyl group or other functional group, and may have a branched structure. The higher aliphatic amines or amides may be a complex type having a polyalkylene oxide skeleton.

Examples of higher aliphatic amides include aliphatic alkyl amides, fatty acid alkanol amides, alkylol amides, and the like.

The surfactant A is preferably a surfactant having an HLB value of 7 or more and 18 or less.

Examples of commercially available products of nonionic surfactants having an HLB value of 7 or more and 18 or less and having a molecular weight of less than 10,000 include ADEKATOL TN-40, TN-80, TN-100, LA-675B, LA-775, LA-875, LA-975, LA-1275, and OA-7 (the above are trade names, manufactured by ADEKA Corporation), CL-40, CL-50, CL-70, CL-85, CL-95, CL-100, CL-120, CL-140, CL-160, CL-200, and CL-400 (the above are trade names, manufactured by Sanyo Chemical Industries, Ltd.), Noigen XL-40, -41, -50, -60, -6190, -70, -80, -100, -140, -160, -160S, -400, -400D, -1000, Noigen TDS-30, -50, -70, -80, -100, -120, -200D, -500F, Noigen EA-137, -157, -167, -177, -197D, DKS NL-30, -40, -50, -60, -70, -80, -90, -100, -110, -180, -250, Noigen ET-89, -109, -129, -149, -159, -189, Noigen ES-99D, -129D, -149D, -169D, Sorgen TW-20, -60, -80V, -80DK, Ester F-160, -140, -110, -90, -70 (the above are trade names, manufactured by DKS Co., Ltd.), Latemul PD-450, PD-420, PD-430, PD-430S, Rheodol TW-L 106, TW-L 120, TW-P 120, TW-S106V, TW-S 120V, TW-S320V, TW-O 106V, TW-O 120V, TW-O 320V, Rheodol 430V, 440V, 460V, Rheodol Super SP-L 10, TW-L 120, Emanorn 1112, 3199V, 4110V, 3299RV, 3299V, Emulgen 109P, 1020, 123P, 130K, 147, 150, 210P, 220, 306P, 320P, 350, 404, 408, 409 PV, 420, 430, 1108, 1118S-70, 1135S-70, 1150 S-60, 4085, A-60, A-90, A-500, and B-66 (the above are trade names, manufactured by Kao Corporation), Sorbon T-20, Sorbon S-10E, and Pegnol 24-0 (the above are trade names, manufactured by Toho Chemical Industry Co., Ltd.), and the like.

The upper limit of the content of the surfactant A is 7 parts by mass or less when the total content of the resin of the resin dispersion and the polyolefin wax is 100 parts by mass, preferably 6 parts by mass or less, more preferably 5 parts by mass or less, even more preferably 4 parts by mass or less, and yet more preferably 3 parts by mass or less. The lower limit is 0 parts by mass or more, but is preferably 0.5 parts by mass or more, more preferably 1 part by mass or more, even more preferably 1.5 parts by mass or more, and particularly preferably 2 parts by mass or more. When the content of the surfactant A is within the above range, the water resistance and abrasion resistance of the recorded matter are further improved, and it is possible to obtain recorded matter excellent in image quality.

In order to make the surfactant A within the above range, it is preferable to use a resin dispersion or a polyolefin wax emulsion in which the content of the surfactant A is adjusted within a predetermined range, but the surfactant A may be set to a predetermined range by adjusting the adding amount of the surfactant A when preparing the ink.

In addition, in a case where the total parts by mass of the surfactant A is 1, the parts by mass (content ratio) of the ionic surfactant is preferably 0.1 or more and 0.7 or less, and more preferably 0.2 or more and 0.5 or less. The parts by mass of the nonionic surfactant form the remainder and are preferably 0.3 or more and 0.9 or less, and more preferably 0.5 or more and 0.8 or less. As the surfactant A, the parts by mass of the ionic surfactant and the nonionic surfactant being in the range described above makes it possible to have both reactivity with the reaction liquid and the storage stability of the ink, to further improve the water resistance and abrasion resistance, and to obtain recorded matter excellent in image quality.

In the surfactant A, it was found that less ionic surfactant is preferable from the viewpoint of excellent reactivity of the ink in a case of using the reaction liquid. This is presumed to be because having less ionic surfactant reduces the dispersion instability due to small amounts of the aggregating agent since the ionic surfactant A reacts with the aggregating components of the reaction liquid and causes dispersion instability. On the other hand, it was found that it is preferable to include an ionic surfactant from the viewpoint of the ejection reliability of ink. Meanwhile, it is not that the nonionic surfactant has an effect of directly improving the reactivity of the ink, but in a case where the ionic surfactant is present, it is presumed that this works to prevent a decrease in the reactivity of the ink. The ionic surfactant reacts with the aggregating agent and the reaction of the resin of the ink and the pigment with the aggregating agent may decrease, but it is presumed that the nonionic surfactant works to prevent the ionic surfactant and the aggregating agent reacting.

The content of the surfactant A with respect to the total mass of the ink composition is preferably 1% by mass or less, more preferably 0.6% by mass or less, and even more preferably 0.4% by mass or less. The lower limit of the content is 0% by mass or more, but is preferably 0.05% by mass or more, more preferably 0.1% by mass or more, and even more preferably 0.2% by mass or more. Within the range described above, the abrasion resistance, water resistance, image quality, and the like are particularly excellent, which is preferable.

1.2.7. Surfactant Other than Surfactant A

The aqueous ink composition according to the present embodiment may contain a surfactant in addition to the surfactant A described above. The surfactant is not particularly limited, and examples thereof include a nonionic surfactant other than surfactant A, an acetylene glycol-based surfactant, a fluorine-based surfactant, and a silicone-based surfactant, and it is preferable to contain at least one kind thereof. It is known that these surfactants are segregated on the upper surface of the ink coating film formed on the recorded matter, and it is presumed that these surfactants do not enter the interior of the ink resin or wax. Therefore, these surfactants do not cause a decrease in the water resistance and abrasion resistance of the obtained recorded matter.

Nonionic surfactants other than the above are nonionic surfactants having an HLB of less than 7 or an HLB of more than 18, and include antifoaming agents and the like.

The acetylene glycol-based surfactant is not particularly limited, but preferable examples thereof include one kind or more selected from 2,4,7,9-tetramethyl-5-decyne-4,7-diol and alkylene oxide adducts of 2,4,7,9-tetramethyl-5-decyne-4,7-diol, and 2,4-dimethyl-5-decyn-4-ol and alkylene oxide adducts of 2,4-dimethyl-5-decyn-4-ol. Commercial products of acetylene glycol-based surfactants are not particularly limited, and examples thereof include E series (trade names, manufactured by Air Products) such as Olfine 104 series and Olfine E 1010, Surfynol 465, Surfynol 61, and Surfynol DF 110D (trade name, manufactured by Nissin Chemical Industry Co., Ltd.), and the like. The acetylene glycol-based surfactant may be used alone or in a combination of two or more kinds.

The fluorine-based surfactant is not particularly limited, and examples thereof include perfluoroalkyl sulfonate, perfluoroalkyl carboxylate, perfluoroalkyl phosphate ester, perfluoroalkyl ethylene oxide adduct, perfluoroalkyl betaine, and perfluoroalkyl amine oxide compounds. Commercial products of fluorine-based surfactants are not particularly limited and examples thereof include Surflon S144, S145 (the above are trade names, manufactured by AGC Seimi Chemical Co., Ltd.); FC-170C, FC-430, Fluorad-FC 4430 (the above are trade names, manufactured by Sumitomo 3M Ltd.); FSO, FSO-100, FSN, FSN-100, FS-300 (the above are trade names, manufactured by Dupont); FT-250, 251 (the above are trade names, manufactured by Neos Co., Ltd.). The fluorine-based surfactant may be used alone or in a combination of two or more kinds thereof.

The silicone-based surfactant is not particularly limited, and examples thereof include a polysiloxane-based compound, a polyether-modified organosiloxane, and the like. Commercial products of silicone-based surfactants are not particularly limited, but specific examples thereof include BYK-306, BYK-307, BYK-333, BYK-341, BYK-345, BYK-346, BYK-347, BYK-348, and BYK-349 (the above are trade names, manufactured by BYK Additives & Instruments), KF-351 A, KF-352 A, KF-353, KF-354 L, KF-355 A, KF-615 A, KF-945, KF-640, KF-642, KF-643, KF-6020, X-22-4515, KF-6011, KF-6012, KF-6015, and KF-6017 (the above are trade names, manufactured by Shin-Etsu Chemical Co., Ltd.).

Among these, it is possible for the acetylene glycol-based surfactant to further improve nozzle clogging recoverability. On the other hand, the fluorine-based surfactant and the silicone-based surfactant are preferable in the point of having an action of spreading uniformly so as not to cause density unevenness or bleeding of the ink on the recording medium. Accordingly, in the present embodiment, it is more preferable that the aqueous ink composition contain at least one of a silicone-based surfactant and a fluorine-based surfactant, and an acetylene glycol-based surfactant.

The content of the surfactant other than the surfactant A is preferably 0.1% by mass or more with respect to the total mass (100% by mass) of the aqueous ink composition, more preferably 0.3% by mass or more, and particularly preferably 0.5% by mass or more. On the other hand, the upper limit of the content is preferably 5% by mass or less, more preferably 3% by mass or less, even more preferably 2% by mass or less, and particularly preferably 1.5% by mass or less. When the content of the surfactant is in this range, there is an action of uniformly spreading so as not to cause uneven density or bleeding of the ink on the recording medium, which is preferable.

1.2.8. Other Contained Components

The aqueous ink composition forming the ink set according to the present embodiment may further contain a pH adjusting agent, a preservative/fungicide, a rust inhibitor, a chelating agent, a moisturizing agent other than the organic solvent, or the like. When these materials are added, it is possible to further improve the characteristics of the aqueous ink composition.

Examples of pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

Examples of preservatives/fungicides include sodium benzoate, sodium pentachlorophenol, sodium 2-pyridinethiol-1-oxide, sodium sorbate, sodium dehydroacetate, 1,2-dibenzisothiazolin-3-one, and the like. Examples of commercial products include Proxel XL2, Proxel GXL (the above are trade names, manufactured by Avecia Ltd.), Denicide CSA, NS-500W (the above are trade names, manufactured by Nagase ChemteX Corporation), and the like.

Examples of rust inhibitors include benzotriazole and the like.

Examples of chelating agents include ethylenediaminetetraacetic acid and salts thereof (disodium ethylenediaminetetraacetate disodium salt, and the like) and the like.

Examples of a moisturizing agent other than an organic solvent include trimethylolpropane, sugar, and the like.

1.2.9. Method for Preparing Aqueous Ink Composition

The aqueous ink composition according to the present embodiment is obtained by mixing the components described above in an arbitrary order and, as necessary, removing impurities by filtration or the like. As a method of mixing the respective components, a method is suitably used in which materials are sequentially added to a container provided with a stirrer such as a mechanical stirrer or a magnetic stirrer, and stirred and mixed. As a filtration method, it is possible to carry out centrifugal filtration, filter filtration, and the like as necessary.

1.2.10. Physical Properties of Aqueous Ink Composition

In the aqueous ink composition of the present embodiment, from the viewpoint of balance between image quality and reliability as ink for ink jet recording, the surface tension at 20° C. is preferably 20 mN/m or more and 40 mN/m or less, and more preferably 20 mN/m or more and 35 mN/m or less. Here, for the measurement of the surface tension, for example, it is possible to carry out measurement by confirming the surface tension when a platinum plate is wetted with ink in an environment of 20° C. using an automatic surface tensiometer CBVP-Z (trade name, manufactured by Kyowa Interface Science Co., Ltd.).

Here, the absolute value of the difference in surface tension between the aqueous ink composition and the reaction liquid described below is preferably 15 mN/m or less, more preferably 10 mN/m or less, even more preferably 7 mN/m or less, and yet more preferably 5 mN/m or less. The absolute value of the difference in surface tension between the aqueous ink composition and the reaction liquid being 15 mN/m or less secures the wettability at the time of recording, thus it is possible to perform recording excellent in image quality.

In addition, from the same viewpoint, the viscosity of the aqueous ink composition used in the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) under an environment of 20° C.

1.3. Reaction Liquid

Next, a description will be given of the reaction liquid used with the aqueous ink composition according to the present embodiment. The reaction liquid used in the present embodiment contains an aggregating agent for aggregating the components of the aqueous ink composition. A detailed description will be given below of components which are included and components which are able to be included in the reaction liquid used in the present embodiment.

Here, in the present embodiment, the reaction liquid is an auxiliary liquid which contains a coloring material in an amount of 0.2% by mass or less and which is attached to the recording medium and used before attaching the aqueous ink composition and not the aqueous ink composition described above used for coloring a recording medium.

1.3.1. Aggregating Agent

The reaction liquid in the present embodiment contains an aggregating agent for aggregating the components of the ink composition. Due to the reaction liquid including an aggregating agent, in the ink composition attaching step described below, the aggregating agent and the resin included in the aqueous ink composition react promptly. Then, the dispersed state of the coloring material or resin in the aqueous ink composition is destroyed, and the coloring material and the resin are aggregated. Since this aggregate inhibits permeation of the coloring material into the recording medium, it is considered excellent in terms of improving the image quality of the recorded image.

Examples of aggregating agents include a polyvalent metal salt, a cationic compound which is a cationic polymer or a cationic surfactant, and organic acid. These aggregating agents may be used alone or in a combination of two or more kinds. Among these aggregating agents, it is preferable to use at least one kind of aggregating agent selected from the group consisting of a polyvalent metal salt and a cationic compound from the viewpoint of excellent reactivity with the resin contained in the aqueous ink composition.

The polyvalent metal salt is formed of divalent or higher polyvalent metal ions and anions bonded to these polyvalent metal ions, and is a compound soluble in water. Specific examples of polyvalent metal ions include divalent metal ions such as $Ca^{2+}$, $Cu^{2+}$, $Ni^{2+}$, $Mg^{2+}$, $Zn^{2+}$, $Ba^{2+}$, and the like; and trivalent metal ions such as $Al^{3+}$, $Fe^{3+}$, and $Cr^{3+}$. Examples of anions include $Cl^-$, $I^-$, $Br^-$, $SO_4^{2-}$, $ClO^{3-}$, $NO^{3-}$, and $HCOO^-$, $CH_3COO^-$, and the like. Among these polyvalent metal salts, calcium salts and magnesium salts are preferable from the viewpoints of stability of the reaction liquid and reactivity as an aggregating agent.

Preferable example of organic acid include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, a derivative of these compounds, or a salt thereof, and the like. One kind of organic acid may be used alone, or two or more kinds may be used in a combination.

Examples of cationic polymers include a cationic urethane resin, a cationic olefin resin, a cationic allylamine resin, and the like.

As the cationic urethane resin, it is possible to appropriately select and use known resins. It is possible to use commercial products as the cationic urethane resins and, for example, it is possible to use Hydran CP-7010, CP-7020, CP-7030, CP-7040, CP-7050, CP-7060, and CP-7610 (the above are trade names, manufactured by Dainippon Ink & Chemicals, Inc.), Superflex 600, 610, 620, 630, 640, and 650 (the above are trade names, manufactured by DKS Co., Ltd.), urethane emulsion WBR-2120C and WBR-2122C (the above are trade names, manufactured by Taisei Fine Chemical Co., Ltd.), and the like.

The cationic olefin resin has an olefin such as ethylene or propylene in the structural skeleton thereof, and it is possible to appropriately select and use known resins. In addition, the cationic olefin resin may be in an emulsion state of being dispersed in a solvent including water, an organic solvent, or the like. As the cationic olefin resin, it is possible to use commercial products and examples thereof include Arrow-Base CB-1200, CD-1200 (the above are trade names, manufactured by Unitika Ltd.), and the like.

It is possible to appropriately select and use known resins as the cationic allylamine resins, and examples thereof include polyallylamine hydrochloride, polyallylamine amide sulfate, allylamine hydrochloride-diallylamine hydrochloride copolymer, allylamine acetate-diallylamine acetate copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amide sulfate, polymethyldiallylamine acetate, polydiallyldimethylammonium chloride, diallylamine acetate-sulfur dioxide copolymer, diallylmethylethylammoniumethylsulfate-sulfur dioxide copolymers, methyl diallyl amine hydrochloride-sulfur dioxide copolymers, diallyldimethylammonium chloride-sulfur dioxide copolymers, diallyldimethylammonium chloride-acrylamide copolymer, and the like. It is possible to use commercial products such as cationic allylamine resins and, for example, it is possible to use PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15 C, PAA-25, PAA-H-10C, PAA-D11-HCL, PAA-D41-HCL, PAA-D19-HCL, PAS-21CL, PAS-M-1L, PAS-M-1, PAS-22 SA, PAS-M-1A, PAS-H-1L, PAS-H-5L, PAS-H-10L, PAS-92, PAS-92A, PAS-J-81L, and PAS-J-81 (the above are trade names, manufactured by Nittobo Medical Co., Ltd.), Hymo Neo-600, Himoloc Q-101, Q-311, Q-501, and Himax SC-505 (the above are trade names, manufactured by Hymo Co., Ltd.), or the like.

In addition, it is also possible to use cationic surfactants. Examples of cationic surfactants include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salts, imidazolinium salts, and the like. Specific examples of cationic surfactants include hydrochlorides such as laurylamine, Coco amine, and rosinamine, acetates, and the like, lauryltrimethylammonium chloride, cetyltrimethylammonium chloride, benzyltributylammonium chloride, benzalkonium chloride, dimethylethyl lauryl ammonium chloride ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The concentration of the aggregating agent in the reaction liquid may be 0.03 mol/kg or more in 1 kg of the reaction liquid. In addition, in 1 kg of the reaction liquid, the concentration may be 0.1 mol/kg or more and 1.5 mol/kg or less, and may be 0.2 mol/kg or more and 0.9 mol/kg or less. In addition, the content of the aggregating agent may be 0.1% by mass or more and 25% by mass or less with respect to the total mass (100% by mass) of the reaction liquid, may be 0.2% by mass or more and 20% by mass or less, and may be 0.3% by mass or more and 10% by mass or less.

1.3.2. Water

The reaction liquid in the present embodiment is preferably an aqueous reaction liquid with water as the main solvent. This water is a component which is evaporated and scattered by drying after attaching the reaction liquid to the recording medium. As the water, water is preferable in which ionic impurities are removed as much as possible like pure water or ultrapure water such as ion-exchanged water, ultra-filtered water, reverse osmosis water, and distilled water. In addition, the use of water sterilized by ultraviolet ray irradiation or the addition of hydrogen peroxide or the like is suitable since it is possible to prevent the propagation of fungi and bacteria in a case where the reaction liquid is stored for a long time. It is possible to set the content of water included in the reaction liquid to, for example, 40% by mass or more with respect to the total mass of the reaction liquid (100% by mass), preferably 50% by mass or more, more preferably 55% by mass or more, and even more preferably 65% by mass or more.

1.3.3. Organic Solvent

The reaction liquid in the present embodiment may contain an organic solvent. Containing an organic solvent makes it possible to improve the wettability of the reaction liquid on the recording medium. As the organic solvent, it is possible to use the same organic solvents as those exemplified for the aqueous ink composition described above. The content of the organic solvent is not particularly limited, but it is possible to set the content to, for example, 1% by mass or more and 40% by mass or less with respect to the total mass (100% by mass) of the reaction liquid, and preferably 5% by mass or more and 30% by mass or less.

It is possible for the standard boiling point of the organic solvent to be the same as the range of the standard boiling point of the organic solvent included in the ink, independently of the boiling point of the organic solvent included in the ink. Here, as the organic solvent in the reaction liquid, in the same manner as the aqueous ink composition described above, the content of a water-soluble organic solvent having a standard boiling point higher than 280° C. in the reaction liquid is preferably 3% by mass or less, more preferably 1% by mass or less, and even more preferably 0.5% by mass or less. In such a case, since the drying property of the reaction liquid is good, drying of the reaction liquid is quickly carried out, and the obtained recorded matter is excellent in tackiness reduction and abrasion resistance.

1.3.4. Surfactant

A surfactant may be contained in the reaction liquid in the present embodiment. Adding the surfactant makes it possible to lower the surface tension of the reaction liquid and to improve the wettability with the recording medium. Among the surfactants, for example, it is possible to preferably use an acetylene glycol-based surfactant, a silicone-based surfactant, or a fluorine-based surfactant. As specific examples of these surfactants, it is possible to use the same surfactants as exemplified for the aqueous ink composition described below. The content of the surfactant is not particularly limited, but it is possible to set the content to be 0.1% by mass or more and 1.5% by mass or less with respect to the total mass (100% by mass) of the reaction liquid.

1.3.5. Other Components

The pH adjusting agent, antiseptic/fungicide, rust inhibitor, chelating agent, and the like may be contained in the reaction liquid used in the present embodiment, as necessary.

1.3.6. Method of Preparing Reaction Liquid

It is possible to manufacture the reaction liquid used in the present embodiment by dispersing and mixing the respective components described above by an appropriate method. After thoroughly stirring each of the above components, filtration is carried out in order to remove coarse particles and foreign matter which cause clogging to obtain the desired reaction liquid.

1.3.7. Physical Properties of Reaction Liquid

In a case where the reaction liquid used in the present embodiment is ejected from an ink jet head, the surface tension at 20° C. is preferably 20 mN/m or more and 40 mN/m or less, and more preferably 20 mN/m or more and 35 mN/m or less. Here, for the measurement of the surface tension, for example, it is possible to carry out measurement by confirming the surface tension when a platinum plate is wetted with the reaction liquid in an environment of 20° C. using an automatic surface tensiometer CBVP-Z (trade name, manufactured by Kyowa Interface Science Co., Ltd.).

In addition, from the same viewpoint, the viscosity of the reaction liquid in the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Physica) under an environment of 20° C.

1.4. Recording Medium

The aqueous ink composition described above has ink drying properties and by being used in a combination with a reaction liquid, the water resistance and abrasion resistance are improved, and it is possible to obtain recorded matter excellent in image quality, not only in an ink absorbing recording medium, but also in recording on a recording medium with an ink non-absorbing property or a low ink absorbing property.

Examples of the ink absorbing recording medium include fabrics such as cotton, silk, polyester, polyurethane, and nylon with a high ink absorbing property, plain paper, paper exclusively for ink jet, high quality paper with a moderate absorbing property, copy paper, and the like.

Examples of recording media with an ink non-absorbing property include a plastic film which is not surface-treated for ink jet recording (that is, on which an ink absorbing layer is not formed), a recording medium where plastic is coated on a base material such as paper, a recording medium to which a plastic film is attached, or the like. Examples of plastics here include polyvinyl chloride, polyethylene terephthalate, polycarbonate, polystyrene, polyurethane, polyethylene, polypropylene, and the like. Examples of recording media with a low ink absorbing property include printing paper such as art paper, coated paper, and matte paper. In the present specification, a recording medium with an ink non-absorbing property or with a low ink absorbing property is also referred to simply as a "plastic medium".

Here, the "recording medium with an ink non-absorbing property or with a low ink absorbing property" in the present specification means a "recording medium having a water absorption amount of 10 mL/m$^2$ or less from the start of contact to 30 msec$^{1/2}$ in the Bristow method". This Bristow method is the most popular method as a method for measuring the amount of liquid absorption in a short time and is also adopted by Japan Technical Association of the Pulp and Paper Industry (JAPAN TAPPI). The details of the test method are described in Standard No. 51 "Paper and paperboard-Liquid absorbing property test method-Bristow method" in "JAPAN TAPPI 2000 Paper Pulp Test Method".

Examples of recording media with an ink non-absorbing property include a plastic film which does not have an ink absorbing layer, a recording medium in which plastic is applied on a base material such as paper, a recording medium to which a plastic film is attached, and the like. Examples of plastics here include polyvinyl chloride, polyethylene terephthalate, polycarbonate, polystyrene, polyurethane, polyethylene, polypropylene, and the like.

Examples of recording media with a low ink absorbing property include a recording medium provided with a coating layer for receiving ink on the surface thereof and, in a case of a recording medium where the base material is paper, examples include printing paper such as art paper, coated paper, and matte paper, while in a case of a recording medium where the base material is a plastic film, examples include recording media in which a hydrophilic polymer is coated on the surface of polyvinyl chloride, polyethylene terephthalate, polycarbonate, polystyrene, polyurethane, polyethylene, polypropylene or the like, or recording media in which particles such as silica or titanium are coated with a binder. These recording media may be transparent recording media.

In addition, it is possible to suitably use the above for recording medium with an ink non-absorbing property or a low ink absorbing property having irregularities on the surface thereof such as embossed media.

Here, in a case where the ink jet recording apparatus 1 is a serial type recording apparatus, the length of the recording medium along the scanning direction of the serial type head is preferably 3.2 m or less. In such a case, the time during which the recording medium faces the ink jet head during one main scan, that is, the time during which the nozzles not used during one scan receive heat from the recording medium, is 12 seconds or shorter, it is possible to suppress drying and composition variations of the ink composition in the nozzles, and it is possible to reduce the deposition of the resin on the inner wall of the nozzle. As a result, it is possible to suppress landing deviation of the ink during continuous printing, and the clogging recoverability of the nozzle is also good. Here, the lower limit of the preferable recording medium width is 30 cm or more.

2. Recording Method

The recording method according to the present embodiment is a recording method using the aqueous ink composition and the reaction liquid according to the present embodiment, and the recording method includes a reaction liquid attaching step of attaching the reaction liquid to a recording medium, and an ink composition attaching step of attaching the aqueous ink composition to the recording medium. The aqueous ink composition of the embodiment described above is used for such a recording method.

In addition to ink jet printing in which the attachment of the aqueous ink composition according to the present embodiment to the recording medium is attachment in which the aqueous ink composition is ejected from the ink jet head and attached to the recording medium, examples thereof include offset printing, flexographic printing, gravure printing, letterpress printing, screen printing, and the like. Examples of recording methods include an ink jet recording method in which the attachment of an aqueous ink composition to a recording medium is performed by ink jet printing.

A description will be given of an ink jet recording method according to an example of the present embodiment with reference to the drawings.

2.1. Reaction Liquid Attaching Step

The reaction liquid attaching step is a step of attaching a reaction liquid containing an aggregating agent for aggregating the components of the ink composition on the recording medium. Attaching a reaction liquid containing an aggregating agent for aggregating the components of the ink composition to the recording medium prior to the attaching of the ink composition makes it possible to provide water resistance and abrasion resistance and to record an image excellent in image quality.

It is preferable that the recording medium M be heated by the preheater 7 shown in FIGURE before the reaction liquid attaching step or by the IR heater 3 or the platen heater 4 shown in FIGURE at the time of the reaction liquid attaching step. By allowing the reaction liquid to attach to the heated recording medium M, the reaction liquid ejected onto the recording medium M spreads easily on the recording medium M, and it is possible to uniformly coat the reaction liquid. Therefore, the ink attached in the ink composition attaching step described below reacts sufficiently with the reaction liquid, and excellent image quality is able to be obtained. In addition, since the reaction liquid is uniformly coated on the recording medium M, it is possible to reduce the coating amount. For this reason, it is possible to prevent a decrease in the water resistance and abrasion resistance of the obtained recorded matter.

Here, it is possible to set the surface temperature of the recording medium M at the time of attaching the reaction liquid to the same preferable temperature range as at the time of the ink composition attaching step described below, independently of the ink composition attaching step. In a case where the temperature of the recording medium M at the time of attaching the reaction liquid is in the above range, it is possible to uniformly coat the reaction liquid on the recording medium M, and to improve the image quality. In addition, it is possible to suppress the influence of heat on the ink jet head 2.

Here, attachment of the reaction liquid may be performed by ejection by the ink jet head 2, and examples of other methods include a method of coating the reaction liquid with a roll coater or the like, a method of ejecting the reaction liquid, and the like.

2.2. Ink Composition Attaching Step

The ink composition attaching step is a step of ejecting the aqueous ink composition described above from the ink jet head 2 onto the recording medium subjected to the reaction liquid attaching step and attaching the ink composition thereto, and through this step, the ink composition droplets and the reaction liquid react on the recording medium M. Due to this, an image formed of the ink composition is formed on the surface of the recording medium M. In addition, by the reaction liquid containing the aggregating agent, the aggregating agent reacts with the components of the ink on the recording medium M, making it possible to obtain recorded matter with superior water resistance and abrasion resistance.

Here, in the present embodiment, "image" indicates a recording pattern formed from a group of dots, including text printing and solid images. Here, "solid image" means an image pattern of an image in which dots are recorded in all pixels of the pixels which are the minimum recording unit region defined by a recording resolution, and in which the recording region of the recording medium is normally covered with ink and the base of the recording medium is not visible.

In the present embodiment, the heating step and the ink composition attaching step may be performed simultaneously with the reaction liquid attaching step.

The maximum attachment amount of the aqueous ink composition per unit area on the recording medium M is preferably 5 mg/inch$^2$ or more, more preferably 7 mg/inch$^2$ or more, and particularly preferably 9 mg/inch$^2$ or more. The upper limit of the attachment amount of the aqueous ink composition per unit area of the recording medium is not particularly limited, but is preferably 20 mg/inch$^2$ or less, and preferably 15 mg/inch$^2$ or less.

The ink composition attaching step is preferably performed on a heated recording medium M. Due to this, it is possible to quickly dry the ink on the recording medium M, and bleeding is suppressed. In addition, it is possible to form an image excellent in abrasion resistance and glossiness, and also to provide an ink jet recording method excellent in ejection stability.

The surface temperature (primary heating temperature) of the recording medium M at the time of attaching the ink is preferably 50° C. or lower, more preferably 45° C. or lower, even more preferably 40° C. or lower, and yet more preferably 38° C. or lower. The surface temperature of the recording medium at the time of attaching the ink being within the above range makes it possible to suppress the influence of heat on the ink jet head 2 and to prevent clogging of the nozzle. In addition, the lower limit of the surface temperature of the recording medium M at the time of ink jet recording is preferably 32° C. or higher, more preferably 34° C. or higher, and even more preferably 36° C. or higher. The lower limit of the surface temperature of the recording medium M during ink jet recording being 32° C. or higher makes it possible to quickly dry the ink on the recording medium M, to suppress bleeding, and to obtain recorded matter excellent in water resistance and abrasion resistance.

Here, in a case where the ink jet recording apparatus 1 is a serial type recording apparatus, it is preferable that the time during which the recording medium faces the ink jet head 2 during one main scan be 12 seconds or shorter. The upper limit of this time is more preferably 10 seconds or shorter, and particularly preferably 6 seconds or shorter. The lower limit of this time is preferably 1 second or longer, more preferably 2 seconds or longer, and particularly preferably 3 seconds or longer. The time during which the recording medium M faces the ink jet head 2 during one main scan is equal to the time during which a nozzle not used during one scan receives heat from the recording medium M without performing the cleaning step described below. In other words, if the time is within the above range, since the time during which the nozzles not used during one main scan receive heat from the recording medium M is sufficiently short, it is possible to suppress the drying and composition variation of the ink composition in the nozzle and to reduce the deposition of the resin on the inner wall of the nozzles without performing a cleaning step. As a result, it is possible to suppress landing deviation of the ink during continuous printing and the clogging recoverability of the nozzle is further improved.

2.3. Secondary Heating Step

The ink jet recording method according to the present embodiment may have a secondary heating step of heating the recording medium M to which the aqueous ink composition is attached by the curing heater 5 shown in FIGURE after the ink composition attaching step. Due to this, the resin or the polyolefin wax included in the aqueous ink composition on the recording medium M are dissolved to form an ink film. In this manner, the ink film firmly fixes (adheres) to the recording medium M, and it is possible to obtain a high-quality image excellent in water resistance and abrasion resistance in a short time.

The temperature (secondary heating temperature) at which the surface of the recording medium M is heated by the curing heater 5 is preferably 40° C. or higher and 120° C. or lower, more preferably 60° C. or higher and 100° C. or lower, and even more preferably 80° C. or higher and 90° C. or lower. The heating temperature being within the above range further improves the abrasion resistance of the obtained recorded matter and makes it possible to form an ink film on the recording medium M with high adhesion.

Here, after the secondary heating step, there may be a step of cooling the ink composition on the recording medium M using the cooling fan 6 shown in FIGURE.

2.4. Cleaning Step

The ink jet recording method according to the present embodiment may be provided with a cleaning step of discharging the ink composition and the reaction liquid by a unit other than a pressure generating unit that ejects ink to carry out recording, that is, by a mechanism other than the mechanism for ejecting ink for recording provided in the ink jet head 2.

The pressure generating unit for ejecting the ink and carrying out recording is a mechanism for ejecting ink for recording provided in the ink jet head 2 and examples thereof include a piezo element provided in a pressure chamber and applying pressure to the ink and a heater element. Examples of a cleaning step by other units include a step of externally applying pressure to the ink jet head 2 from outside to discharge the aqueous ink composition from the nozzle, a sucking and cleaning step of sucking the ink from the nozzle of the ink jet head and discharging the ink from the nozzle, and the like. By providing this step, even in a case where there is a concern that the resin will be deposited on the inner wall of the ink jet head 2, it is possible to suppress the deposition and to improve the clogging property, which is even more excellent.

In addition, in the ink jet recording method according to the present embodiment, it is preferable to control the ink jet recording apparatus 1 so as to perform recording for one hour or longer without performing the above cleaning step, that is, without cleaning. By carrying out the control in this manner, there is no reduction in the recording speed due to interruption of recording due to the cleaning step. In addition, in the present embodiment, even in the case of not carrying out cleaning, using the ink composition described above makes it possible to suppress clogging of the ink jet head 2 and to record a good image excellent in abrasion resistance.

Here, examples of the other mechanisms described above include a mechanism for applying pressure such as application of suction (negative pressure) or the application of positive pressure from the upstream of the head. These mechanisms are not ink discharging (flushing) using the function of the ink jet head itself. In other words, these mechanisms are not discharging using the function of ejecting ink from the ink jet head in recording.

In addition, the recording time may not be continuous, and recording may be paused unless pressure is externally applied to the ink jet head to discharge the aqueous ink composition from the nozzle. Here, the recording time is the time for recording including the scanning and the time between scans.

The recording time is preferably 1 hour or longer, more preferably 1.5 hours or longer, even more preferably 2 hours or longer, and particularly preferably 3 hours or longer. The upper limit of the recording time is not limited, but is preferably 10 hours or shorter, more preferably 5 hours or shorter, and even more preferably 4 hours or shorter.

In addition, the ink jet recording method according to the present embodiment is preferable in the point described above that, when performing recording one time, the cleaning step described above is not performed during recording. In addition, even if the above-described cleaning step is performed at least either before recording or after recording, it is preferable in view of the point described above.

As described above, in the aqueous ink composition, the ink jet recording method, and the ink jet recording apparatus according to the present embodiment, controlling the content of the surfactant A included in the aqueous ink composition to be as small as 7 parts by mass or less with respect to the total of the solid content of the resin of the resin emulsion and the wax makes it possible to provide an aqueous ink composition, an ink jet recording method, and an ink jet recording apparatus, in which it is difficult for the surfactant A to be absorbed in the ink layer of the recorded matter, with which the water resistance and abrasion resistance of the recorded matter are improved, and which is able to obtain recorded matter excellent in image quality. In addition, it is possible to provide the present embodiment in which the water resistance and abrasion resistance of the recorded matter are improved and which obtains recorded matter excellent in image quality as an ink set provided with the aqueous ink composition according to the present embodiment and the reaction liquid as described above.

3. Examples

A more specific description will be given below of embodiments of the invention with reference to Examples and Comparative Examples, but the present embodiment is not limited to only these Examples.

3.1. Preparation of Ink Composition 3.1.1. Preparation of Resin Emulsion (EM)

Resin emulsions 1 to 4 shown in Table 1 were prepared.

TABLE 1

| | Parts by mass of Surfactant A (with respect to 100 parts by mass of resin) | | Ionic Surfactant A |
|---|---|---|---|
| Resin Emulsion 1 | 1.2 | Emulsion polymerization | Sodium lauryl sulfate |
| Resin Emulsion 2 | 0 | — | — |
| Resin Emulsion 3 | 10 | Emulsion polymerization | Sodium lauryl sulfate |
| Resin Emulsion 4 | 2 | Emulsion polymerization | Sodium dialkyl succinate sulfonate (Newcol 290-M) |

Resin Emulsion 1

After sufficiently replacing the inside of a flask equipped with a mechanical stirrer, a thermometer, a nitrogen gas inlet tube, a reflux tube and a dropping funnel with a nitrogen gas, 0.75 parts by mass of a surfactant (sodium lauryl sulfate, ionic surfactant A), 0.04 parts by mass of potassium persulfate, 0.2 parts by mass of methacrylic acid, and 150 parts by mass of pure water were charged therein and stirred and mixed at 25° C. A mixture of 20.8 parts by mass of butyl acrylate, 39 parts by mass of butyl methacrylate, and 90 parts by mass of methyl methacrylate was added dropwise to the above mixture, to prepare a pre-emulsion 1. Separately from this, after sufficiently replacing the inside of a flask equipped with a mechanical stirrer, a thermometer, a nitrogen gas inlet tube, a reflux tube and a dropping funnel with nitrogen gas, an amount of 1.2 parts by mass of a surfactant (sodium lauryl sulfate), 0.01 parts by mass of potassium persulfate, and 200 parts by mass of pure water with respect to 100 parts by mass of the obtained resin were stirred at 70° C. and mixed. Thereafter, the pre-emulsion 1 prepared above was added dropwise to a flask over 3 hours. The mixture was further heated and aged at 70° C. for 3 hours, then cooled, 0.75 parts by mass of N,N-dimethyl-2-aminoethanol was added thereto, and the mixture was filtered with #150 mesh (manufactured by Nippon Tokushu Fabric Inc.) to obtain 500 parts by mass of a resin emulsion 1 (solid content 30% by mass, Tg 48° C., acid value 1 mg KOH/g).

Resin Emulsion 2

100 parts of ion-exchanged water were added to a reaction container equipped with a dropping device, a thermometer, a water-cooled reflux condenser, and a stirrer, 0.2 parts of ammonium persulfate as a polymerization initiator were added at 70° C. in a nitrogen atmosphere while stirring, a monomer solution containing 20 parts of styrene, 17 parts of methyl acrylate, 30 parts of methyl methacrylate, and 5 parts of acrylic acid was added dropwise into a reaction container and reacted to polymerize and produce the shell polymer. Thereafter, a mixed solution of 0.2 parts of potassium persulfate, 50 parts of styrene, and 22 parts of n-butyl acrylate was added dropwise thereto and a polymerization reaction was carried out at 70° C. with stirring, then neutralized with sodium hydroxide and adjusted to pH 8 to 8.5, and filtered through a 0.3 μm filter to obtain a resin emulsion 2.

Resin Emulsion 3

Resin emulsion 3 was prepared in the same manner as in the resin emulsion 1 described above, except that the amount of the reactive surfactant was used so as to be 10 parts by mass relative to 100 parts by mass of the resin in resin emulsion 1.

Resin Emulsion 4

Resin emulsion 4 was prepared in the same manner as in the resin emulsion 1 described above, except that a dialkyl succinate sulfonate sodium salt (trade name: Newcol 290-M, ionic surfactant A, manufactured by Nippon Nyukazai Co., Ltd.) as a surfactant was used in an amount of 2 parts by mass with respect to 100 parts by mass of resin in the resin emulsion 1.

Regarding the adjustment of each resin emulsion described above, the basis is shown in Table 1, but the added amount of ionic surfactant A in each ink composition described in Table 4 described below was adjusted for each ink composition, when preparing the resin emulsion to be used, as necessary, such that the parts by mass of the ionic surfactant A with respect to the parts by mass of the resin of the resin emulsion were the values shown in Table 4.

3.1.2. Wax Emulsion (EM)

Wax emulsions 1 to 8 shown in Table 2 were obtained.

TABLE 2

| | Nonionic Surfactant A | Wax particle size (nm) | Wax melting point (° C.) | Parts by mass of Surfactant A (with respect to 100 parts by mass of wax) | Wax kind | Surfactant kind |
|---|---|---|---|---|---|---|
| Wax emulsion 1 | — | 400 | 102 | 0 | Polyolefin | — |
| Wax emulsion 2 | Polyoxyethylene alkyl ether (alkyl ether having 12 or 13 carbon atoms) | 60 | 103 | 3 | Polyolefin | Ethers of polyalkylene oxide |
| Wax emulsion 3 | Ethoxylated aliphatic alcohol (aliphatic alcohol having 16 to 18 carbon atoms) | 150 | 135 | 8 | Polyolefin | Ethers of polyalkylene oxide |
| Wax emulsion 4 | Ethoxylated aliphatic secondary alcohol (aliphatic secondary alcohol having 11 to 15 carbon atoms) | 150 | 120 | 19 | Polyolefin | Ethers of polyalkylene oxide |
| Wax emulsion 5 | Ethoxylated aliphatic alcohol (aliphatic alcohol having 9 to 11 carbon atoms) | 220 | 90 | 20 | Paraffin | Ethers of polyalkylene oxide |
| Wax emulsion 6 | — | 600 | 110 | 0 | Polyolefin | — |
| Wax emulsion 7 | Coconut oil fatty acid diethanol amide | 150 | 135 | 8 | Polyolefin | Higher aliphatic amides |

TABLE 2-continued

|  | Nonionic Surfactant A | Wax particle size (nm) | Wax melting point (° C.) | Parts by mass of Surfactant A (with respect to 100 parts by mass of wax) | Wax kind | Surfactant kind |
|---|---|---|---|---|---|---|
| Wax emulsion 8 | Sorbitan fatty acid ester | 150 | 135 | 8 | Polyolefin | Higher aliphatic acid esters |

Wax Emulsion 1

15 parts by mass of a polyethylene wax having a melting point of 103° C., 7.5 parts by mass of a paraffin wax having a melting point of 88° C., and 7.5 parts by mass of an oxidized polyethylene wax having an acid value of 20 mg KOH/g and a melting point of 110° C., were mixed, heated, and dissolved at 85° C. to 95° C., then 3.0 parts by mass of isopropanol amine were added thereto, 67 parts by mass of hot water at 85 to 95° C. were further gradually added thereto while stirring, and phase inversion emulsification was carried out. After completion of the phase inversion emulsification, the obtained crude emulsion was stirred at a high speed with a homomixer (T.K. Homomixer manufactured by Tokushu Kika Kogyo Co., Ltd.) at 2,500 to 3,500 rpm while maintaining the temperature, followed by homogenizer (APV GAULIN, INC. 15 MR-STA) at a high pressure of 380 to 420 kg/cm². Thereafter, the mixture was cooled to 38° C. while stirring to obtain a surfactant-free wax emulsion 1 having an average particle size of 400 nm and a melting point of 102° C.

Wax Emulsion 2

Into a 1.5 L emulsification apparatus equipped with a stirrer, a thermometer, and a temperature controller, 300 g of an oxidized polyethylene wax having a melting point of 103° C. and an acid value of 16 mg KOH/g, 650 g of ion-exchanged water, and 9 g of a surfactant (trade name: Newcol 2310, manufactured by Nippon Nyukazai Co., Ltd, described in Table 2), and 10 g of a 48% aqueous solution of potassium hydroxide were added and the emulsification apparatus was replaced with nitrogen, then the emulsification apparatus was sealed and the mixture was stirred at 150° C. for 1 hour at high speed, then cooled to 130° C., the mixture was passed through a high pressure homogenizer under 400 atm and cooled to 40° C., a polyethylene-based wax emulsion containing 3 parts by mass of the surfactant described above with respect to 100 parts by mass of polyethylene-based wax having an average particle size of 60 nm and a melting point of 103° C. was prepared, to obtain a wax emulsion 2.

Wax Emulsion 3

As Wax Emulsion 3, AQUACER 513 (trade name manufactured by BYK Additives & Instruments, a polyethylene wax emulsion containing 8 parts by mass of the surfactant shown in Table 2 with respect to 100 parts by mass of polyethylene-based wax, particle size 150 nm, and melting point 135° C.) was used.

Wax Emulsion 4

As Wax Emulsion 4, AQUACER 517 (trade name manufactured by BYK Additives & Instruments, a polyethylene wax emulsion containing 19 parts by mass of the surfactant shown in Table 2 with respect to 100 parts by mass of polyethylene-based wax, particle size 150 nm, and melting point 120° C.) was used.

Wax Emulsion 5

As Wax Emulsion 5, AQUACER 539 (trade name manufactured by BYK Additives & Instruments, a paraffin wax emulsion containing 20 parts by mass of the surfactant shown in Table 2 with respect to 100 parts by mass of paraffin, particle size 220 nm, and melting point 90° C.) was used.

Wax Emulsion 6

As wax emulsion 6 Chemipearl W 4005 (trade name manufactured by Mitsui Chemicals, Inc., a polyethylene wax emulsion not containing a surfactant, particle size 600 nm, and melting point 110° C.) was used.

Wax Emulsion 7

A polyethylene-based wax emulsion was prepared in the same manner as in wax emulsion 2 except that an oxidized polyethylene wax having a melting point of 135° C. and an acid value of 20 mg KOH/g was used as a wax, and Dianol CDE (aliphatic acid amide manufactured by DKS Co., Ltd.) was used as a surfactant. A polyethylene wax emulsion having an average particle size of 150 nm, a melting point of 135° C., and containing 8% by mass of surfactant A with respect to 100 parts by mass of a polyethylene-based wax was prepared as a wax emulsion 7.

Wax Emulsion 8

A polyethylene-based wax emulsion was prepared in the same manner as in wax emulsion 2 except that an oxidized polyethylene wax having a melting point of 135° C. and an acid value of 20 mg KOH/g was used as a wax and 24 g of Sorbon T-20, a trade name manufactured by Toho Chemical Industry Co., Ltd., was used as a surfactant. A polyethylene wax emulsion containing 8% by mass of a surfactant based on 100 parts by mass of the polyethylene-based wax and having an average particle size of 150 nm, and a melting point of 135° C. was prepared as a wax emulsion 8.

In the adjustment of each wax emulsion described above, the basis is shown in Table 2, but the added amount of the nonionic surfactant A in each ink composition described in Table 4 described below was adjusted for each ink composition, when adjusting the wax emulsion to be used, as necessary, such that the parts by mass of the nonionic surfactant A with respect to the parts by mass of the resin of the wax emulsion were the values shown in Table 4. Alternatively, the amount of the surfactant A added was adjusted during the preparation of the ink composition.

3.1.3. Preparation of Reaction Liquid

Reaction liquids 1 to 7 were prepared by mixing and stirring the respective components according to the compositions shown in Table 3 and carrying out filtration through a membrane filter of 10 μm. All of the numerical values in Table 3 represent % by mass, and pure water was added thereto such that the total mass of the reaction liquid was 100% by mass. For each reaction liquid, the surface tension was measured in the same manner as for the ink described below.

TABLE 3

|  | Reaction liquid 1 | Reaction liquid 2 | Reaction liquid 3 | Reaction liquid 4 | Reaction liquid 5 | Reaction liquid 6 | Reaction liquid 7 |
|---|---|---|---|---|---|---|---|
| Calcium acetate | 1.5 |  | 1 |  |  | 1.5 | 1.5 |
| Calcium pantothenate |  | 4.5 | 3 |  |  |  |  |
| Acetic acid |  |  |  | 4 |  |  |  |
| Catiomaster-PD (solid content) |  |  |  |  | 2.5 |  |  |
| 2-pyrrolidone | 10 | 10 | 10 | 10 | 10 | 10 | 10 |
| Dynol 607 | 0.5 | 0.5 | 0.5 | 0.5 | 0.5 |  |  |
| BYK 348 |  |  |  |  |  | 0.5 |  |
| E1010 |  |  |  |  |  |  | 0.5 |
| Water | Remainder | Remainder | Remainder | Remainder | Remainder | Remainder | Remainder |
| Total | 100 | 100 | 100 | 100 | 100 | 100 | 100 |
| Surface tension (mN/m) | 32 | 30 | 32 | 31 | 30 | 25 | 36 |

The details of the substances described by the trade names in Table 3 are as follows.

Catiomaster (registered trademark) PD (trade name, manufactured by Yokkaichi Chemical Co., Ltd., amine-epichlorohydrin condensation type polymer aqueous solution, cationic resin)

Dynol 607 (trade name manufactured by Air Products Japan Co., Ltd., acetylenic diol-based surfactant)

BYK 348 (trade name manufactured by BYK Additives & Instruments, silicone-based surfactant)

E1010 (trade name "Olfine E1010", manufactured by Nissin Chemical Industry Co., Ltd., acetylene glycol-based surfactant)

3.1.4. Preparation of Ink Composition

Each component was mixed and stirred to reach the blending ratios in Table 4 to obtain each ink. All the numerical values in Table 4 indicate % by mass, and pure water was added so that the total mass of the ink was 100% by mass. In addition, regarding the pigment dispersion, the resin emulsion, and the wax emulsion, values converted into the solid contents of the pigment, the resin of the resin emulsion, and the wax, respectively, are shown. The surfactant A used in each ink composition had a mass average molecular weight of less than 10,000 in all cases.

TABLE 4

|  | Organic solvent standard boiling point (° C.) | Ink 1 | Ink 2 | Ink 3 | Ink 4 | Ink 5 | Ink 6 | Ink 7 | Ink 8 | Ink 9 | Ink 10 | Ink 11 | Ink 12 |
|---|---|---|---|---|---|---|---|---|---|---|---|---|---|
| Pigment dispersion (as pigment) |  | 5 | 5 | 5 | 5 | 5 | 5 | 5 | 5 | 5 | 5 | 5 | 5 |
| Resin EM1 (as solid content) |  | 5 | 5 | 5 | 5 | 5 | 5 | 5 |  | 5 | 5 | 5 | 5 |
| Resin EM2 (as solid content) |  |  |  |  |  |  |  |  | 5 |  |  |  |  |
| Resin EM3 (as solid content) |  |  |  |  |  |  |  |  |  |  |  |  |  |
| Resin EM4 (as solid content) |  |  |  |  |  |  |  |  |  |  |  |  |  |
| Wax EM1 (as solid content) |  | 3 |  |  |  |  |  |  |  |  |  |  |  |
| Wax EM2 (as solid content) |  |  | 3 |  |  |  |  |  | 3 | 3 | 3 | 3 | 3 |
| Wax EM3 (as solid content) |  |  |  | 3 |  |  |  |  |  |  |  |  |  |
| Wax EM4 (as solid content) |  |  |  |  | 3 |  |  |  |  |  |  |  |  |
| Wax EM5 (as solid content) |  |  |  |  |  | 3 |  |  |  |  |  |  |  |
| Wax EM6 (as solid content) |  |  |  |  |  |  | 3 |  |  |  |  |  |  |
| Wax EM7 (as solid content) |  |  |  |  |  |  |  |  |  |  |  |  |  |
| Wax EM8 (as solid content) |  |  |  |  |  |  |  | 3 |  |  |  |  |  |
| Glycerine | 290 | 15 | 15 | 15 | 15 | 15 | 15 | 15 |  |  | 15 |  |  |
| 2-pyrrolidone | 245 |  |  |  |  |  |  |  |  | 15 | 15 |  | 15 |
| Diethylene glycol | 244 | 10 | 10 | 10 | 10 | 10 | 10 | 10 | 10 | 10 | 10 | 10 | 10 |
| 1,2-hexanediol | 223 | 2 | 2 | 2 | 2 | 2 | 2 | 2 | 2 | 2 | 2 | 2 | 2 |
| Trimethylol propane |  | 5 | 5 | 5 | 5 | 5 | 5 | 5 | 5 | 5 | 5 | 5 | 5 |

TABLE 4-continued

| | | | | | | | | | | | |
|---|---|---|---|---|---|---|---|---|---|---|---|
| Surfynol 465 | 1 | 1 | 1 | 1 | 1 | 1 | 1 | 1 | | | 1 |
| BKY348 | | | | | | | | | 1 | | |
| E1010 | | | | | | | | | | 1 | |
| Megaface F114 | | | | | | | | | | | |
| Surfactant A (ionic) | 0.06 | 0.06 | 0.06 | 0.06 | 0.06 | 0.06 | 0.00 | 0.06 | 0.06 | 0.06 | 0.06 |
| Surfactant A (nonionic) | 0.00 | 0.09 | 0.24 | 0.57 | 0.60 | 0.00 | 0.24 | 0.09 | 0.09 | 0.09 | 0.09 |
| Water | Remainder | Remainder | Remainder | Remainder | Remainder | Remainder | Remainder | Remainder | Remainder | Remainder | Remainder |
| Total | 100 | 100 | 100 | 100 | 100 | 100 | 100 | 100 | 100 | 100 | 100 |
| Content of surfactant A in ink (% by mass) | 0.06 | 0.15 | 0.30 | 0.63 | 0.66 | 0.06 | 0.30 | 0.09 | 0.15 | 0.15 | 0.15 |
| Ionic content ratio in surfactant A | 1.00 | 0.41 | 0.21 | 0.10 | 0.09 | 1.00 | 0.21 | 0.00 | 0.41 | 0.41 | 0.41 |
| Nonionic content ratio in surfactant A | 0.00 | 0.59 | 0.79 | 0.90 | 0.91 | 0.00 | 0.79 | 1.00 | 0.59 | 0.59 | 0.59 |
| Other surfactant (% by mass) | 1 | 1 | 1 | 1 | 1 | 1 | 1 | 1 | 1 | 0 | 1 |
| Parts by mass of surfactant A with respect to 100 parts by mass (resin + wax) | 0.8 | 1.9 | 3.8 | 7.9 | 8.3 | 0.8 | 3.8 | 1.1 | 1.9 | 1.9 | 1.9 |
| Surface tension (mN/m) | 29 | 30 | 30 | 31 | 31 | 31 | 30 | 31 | 26 | 35 | 43 | 30 |
| Ink storage stability | B | A | A | B | A | B | A | B | A | A | A | A |

| | Organic solvent standard boiling point (° C.) | Ink 13 | Ink 14 | Ink 15 | Ink 16 | Ink 17 | Ink 18 | Ink 19 | Ink 20 | Ink 21 | Ink 22 | Ink 23 |
|---|---|---|---|---|---|---|---|---|---|---|---|---|
| Pigment dispersion (as pigment) | | 5 | 5 | 5 | 5 | 5 | 5 | 5 | 5 | 5 | 5 | 5 |
| Resin EM1 (as solid content) | | | 5 | | 5 | | | | | 3 | 7 | 5 | |
| Resin EM2 (as solid content) | | | | 5 | | | 5 | | | | | | 5 |
| Resin EM3 (as solid content) | | | | | | | | 5 | | | | | |
| Resin EM4 (as solid content) | | | | | | | | | 5 | | | | |
| Wax EM1 (as solid content) | | | | | | | 3 | 3 | | | | | 3 |
| Wax EM2 (as solid content) | | | 3 | | | | | | | 1.5 | 4 | | |
| Wax EM3 (as solid content) | | | | | 3 | | | | | | | | |
| Wax EM4 (as solid content) | | | | | | 2.8 | | | | | | | |
| Wax EM5 (as solid content) | | | | 2.6 | | | | | | | | | |
| Wax EM6 (as solid content) | | | | | | | | | | | | | |
| Wax EM7 (as solid content) | | | | | | | | | | | | 3 | |
| Wax EM8 (as solid content) | | | | | | | | | | | | | |
| Glycerine | 290 | | 15 | 15 | 15 | 15 | 15 | 15 | 15 | 15 | 15 | 15 |
| 2-pyrrolidone | 245 | 15 | | | | | | | | | | |
| Diethylene glycol | 244 | 10 | 10 | 10 | 10 | 10 | 10 | 10 | 10 | 10 | 10 | 10 |
| 1,2-hexanediol | 223 | 2 | 2 | 2 | 2 | 2 | 2 | 2 | 2 | 2 | 2 | 2 |
| Trimethylol propane | | 5 | 5 | 5 | 5 | 5 | 5 | 5 | 5 | 5 | 5 | 5 |
| Surfynol 465 | | 1 | 1 | 1 | 1 | 1 | 1 | 1 | 1 | 1 | 1 | 1 |
| BKY348 | | | | | | | | | | | | |
| E1010 | | | | | | | | | | | | |

TABLE 4-continued

| | | | | | | | | | | | |
|---|---|---|---|---|---|---|---|---|---|---|---|
| Megaface F114 | 1 | | | | | | | | | | |
| Surfactant A (ionic) | 0.06 | 0.00 | 0.06 | 0.00 | 0.00 | 0.50 | 0.10 | 0.04 | 0.08 | 0.06 | 0.00 |
| Surfactant A (nonionic) | 0.09 | 0.52 | 0.00 | 0.24 | 0.53 | 0.00 | 0.00 | 0.05 | 0.12 | 0.24 | 0.00 |
| Water | Remainder | Remainder | Remainder | Remainder | Remainder | Remainder | Remainder | Remainder | Remainder | Remainder | Remainder |
| Total | 100 | 100 | 100 | 100 | 100 | 100 | 100 | 100 | 100 | 100 | 100 |
| Content of surfactant A in ink (% by mass) | 0.15 | 0.52 | 0.06 | 0.24 | 0.53 | 0.50 | 0.10 | 0.08 | 0.20 | 0.30 | 0.00 |
| Ionic content ratio in surfactant A | 0.41 | 0.00 | 1.00 | 0.00 | 0.00 | 1.00 | 1.00 | 0.46 | 0.40 | 0.20 | 0.00 |
| Nonionic content ratio in surfactant A | 0.59 | 1.00 | 0.00 | 1.00 | 1.00 | 0.00 | 0.00 | 0.54 | 0.60 | 0.80 | 0.00 |
| Other surfactant (% by mass) | 1 | 1 | 1 | 1 | 1 | 1 | 1 | 1 | 1 | 1 | 1 |
| Parts by mass of surfactant A with respect to 100 parts by mass (resin + wax) | 1.9 | 6.8 | 1.2 | 8.0 | 6.8 | 6.3 | 1.3 | 1.8 | 1.8 | 3.8 | 0.0 |
| Surface tension (mN/m) | 28 | 31 | 32 | 30 | 31 | 29 | 29 | 29 | 29 | 29 | 31 |
| Ink storage stability | A | B | A | A | B | B | B | A | A | A | C |

The details of the substances described by the trade names in Table 4 are as follows.

Pigment Dispersion

Self-dispersing pigment containing carbonyl group, manufactured by Cabot Corporation, trade name "Cab-O-Jet 300"

Surfactant

Surfynol 465 (trade name, manufactured by Nissin Chemical Industry Co., Ltd., acetylene glycol-based surfactant)

BYK 348 (trade name, silicone-based surfactant, manufactured by BYK Additives & Instruments)

E1010 (trade name "Olfine E1010", manufactured by Nissin Chemical Industry Co., Ltd., acetylene glycol-based surfactant)

Megaface F114 (trade name, manufactured by DIC Corporation, perfluorobutanesulfonate, anionic surfactant)

3.1.5. Evaluation of Ink

With respect to each ink composition obtained, the ink surface tension was measured, and an ink storage stability test was conducted.

Measurement of Surface Tension

The surface tension was measured by confirming the surface tension of the platinum plate when wetted with ink in an environment of 20° C. using an automatic surface tensiometer CBVP-Z (trade name, manufactured by Kyowa Interface Science Co., Ltd.).

Ink Storage Stability Test

The ink composition was placed in a glass bottle so as to be 80% full, held in a constant temperature environment at 70° C. for 3 days, and the viscosity and particle size change before and after storage were observed and evaluated according to the following criteria. Here, the viscosity change was evaluated by measuring the viscosity of the ink at room temperature using a viscometer (product name "MCR-300" manufactured by Physica) and calculating the change in viscosity according to the following expression.

[(viscosity after storage−initial viscosity)/(initial viscosity)]×100(%)

The particle size change is evaluated by measuring the volume average diameter (MV) in the particle size distribution of the particles included in the ink before and after storage respectively, and calculating the change in viscosity according to the following expression.

[(MV after storage−initial MV)/(initial MV)]×100(%)

For the measurement of the volume average diameter in the particle size distribution, a particle size distribution meter ("NANOTRAC UPA-EX 150" manufactured by Nikkiso Co., Ltd.) using the dynamic light scattering method as a measurement principle was used.

Evaluation Criteria

A: viscosity change≤20%, change in particle size≤30%

B: viscosity change≤20%, 30%<change in particle size≤50%

C: viscosity change>20%, change in particle size>50%

3.2. Evaluation Test 3.2.1. Recording Test

A remodeled ink jet printer (trade name "SC-S50650", manufactured by Seiko Epson Corporation) was used. Reaction liquid and ink were filled in the head. The recording medium was transported into the printer, and the reaction liquid was ink jet coated at a resolution of 1440×1440 dpi and an attachment amount of 1.0 mg/inch$^2$. Next, the ink was ink jet coated on the reaction liquid attaching surface with a resolution of 1440×1440 dpi and an attachment amount of 10.0 mg/inch$^2$. At the time of ink jet coating, the platen heater was operated to adjust the surface temperature of the recording medium to the temperatures shown in Tables 5 to 7. In the example at 25° C., the platen heater was turned off. After recording, the recording medium was discharged from the printer and dried at 80° C. for 5 minutes. As a recording medium, a polyvinyl chloride sheet (product number ORAJET 3164 XG-010 (1600 nm) glossy vinyl chloride with gray glue, manufactured by ORAFOL Co., Ltd.) was used. The scanning speed of the carriage on which the ink jet head was mounted was adjusted to adjust the time during which the ink jet head faced the recording medium during scanning for each example such that the printing times in the table were obtained.

TABLE 5

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Reaction liquid | Reaction liquid 1 | Reaction liquid 1 | Reaction liquid 1 | Reaction liquid 1 | Reaction liquid 1 | Reaction liquid 1 | Reaction liquid 1 | Reaction liquid 1 | Reaction liquid 1 | Reaction liquid 1 | Reaction liquid 1 | Reaction liquid 1 |
| Ink | Ink 1 | Ink 2 | Ink 3 | Ink 6 | Ink 8 | Ink 9 | Ink 10 | Ink 11 | Ink 12 | Ink 13 | Ink 17 | Ink 18 |
| Printing temperature (° C.) | 40 | 40 | 40 | 40 | 40 | 40 | 40 | 40 | 40 | 40 | 40 | 40 |
| Scanning time (seconds) | 6 | 6 | 6 | 6 | 6 | 6 | 6 | 6 | 6 | 6 | 6 | 6 |
| Reaction liquid surface tension (mN/m) | 32 | 32 | 32 | 32 | 32 | 32 | 32 | 32 | 32 | 32 | 32 | 32 |
| Ink surface tension (mN/m) | 29 | 30 | 30 | 31 | 31 | 26 | 35 | 43 | 30 | 28 | 31 | 29 |
| Surface tension difference | 3 | 2 | 2 | 1 | 1 | 6 | −3 | −11 | 2 | 4 | 1 | 3 |
| Abrasion resistance evaluation | A | B | B | A | B | A | A | B | A | A | C | C |
| Water resistance evaluation | A | A | B | A | A | A | A | A | A | A | B | A |
| Image quality evaluation | B | A | A | A | A | C | A | C | A | A | A | C |
| Ejection reliability | B | A | A | C | B | B | B | C | B | B | B | A |
| Color development evaluation | A | A | A | A | A | A | A | B | A | A | A | A |
| Gloss evaluation | A | A | B | C | A | A | A | B | A | B | A | A |

TABLE 6

|  | Example 13 | Example 14 | Example 15 | Example 16 | Example 17 | Example 18 | Example 19 | Example 20 | Example 21 | Example 22 | Example 23 | Example 24 |
|---|---|---|---|---|---|---|---|---|---|---|---|---|
| Reaction liquid | Reaction liquid 1 | Reaction liquid 1 | Reaction liquid 1 | Reaction liquid 1 | Reaction liquid 2 | Reaction liquid 2 | Reaction liquid 4 | Reaction liquid 5 | Reaction liquid 6 | Reaction liquid 7 | Reaction liquid 1 | Reaction liquid 1 |
| Ink | Ink 19 | Ink 20 | Ink 21 | Ink 7 | Ink 2 | Ink 2 | Ink 2 | Ink 2 | Ink 2 | Ink 2 | Ink 2 | Ink 2 |
| Printing temperature (° C.) | 40 | 40 | 40 | 40 | 40 | 40 | 40 | 40 | 40 | 40 | 25 | 35 |
| Scanning time (seconds) | 6 | 6 | 6 | 6 | 6 | 6 | 6 | 6 | 6 | 6 | 6 | 6 |
| Reaction liquid surface tension (mN/m) | 32 | 32 | 32 | 32 | 30 | 32 | 31 | 30 | 25 | 36 | 32 | 32 |
| Ink surface tension (mN/m) | 29 | 29 | 29 | 30 | 30 | 30 | 30 | 30 | 30 | 30 | 30 | 30 |
| Surface tension difference | 3 | 3 | 3 | 2 | 0 | 2 | 1 | 0 | −5 | 6 | 2 | 2 |
| Abrasion resistance evaluation | A | C | A | C | B | B | B | B | B | B | C | B |
| Water resistance evaluation | A | B | A | B | B | B | A | A | A | A | B | A |
| Image quality evaluation | C | A | B | A | A | A | B | B | A | C | C | B |
| Ejection reliability | A | A | B | A | A | A | A | A | A | A | A | A |
| Color development evaluation | A | B | A | A | A | A | B | A | A | A | A | A |
| Gloss evaluation | B | B | A | B | A | A | A | A | A | A | A | A |

TABLE 7

|  | Example 25 | Example 26 | Example 27 | Example 28 | Example 29 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Reaction liquid | Reaction liquid 1 | Reaction liquid 1 | Reaction liquid 1 | Reaction liquid 1 | Reaction liquid 1 | Reaction liquid 1 | Reaction liquid 1 | Reaction liquid 1 | Reaction liquid 1 | Reaction liquid 1 | — | — |

TABLE 7-continued

| | Example 25 | Example 26 | Example 27 | Example 28 | Example 29 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Ink | Ink 2 | Ink 2 | Ink 2 | Ink 22 | Ink 23 | Ink 4 | Ink 5 | Ink 14 | Ink 15 | Ink 16 | Ink 2 | Ink 4 |
| Printing temperature (° C.) | 55 | 60 | 40 | 40 | 40 | 40 | 40 | 40 | 40 | 40 | 40 | 40 |
| Scanning time (seconds) | 6 | 6 | 9 | 6 | 6 | 6 | 6 | 6 | 6 | 6 | 6 | 6 |
| Reaction liquid surface tension (mN/m) | 32 | 32 | 32 | 32 | 32 | 32 | 32 | 32 | 32 | 32 | — | — |
| Ink surface tension (mN/m) | 30 | 30 | 30 | 29 | 31 | 31 | 31 | 31 | 32 | 30 | — | — |
| Surface tension difference | 2 | 2 | 2 | 3 | 1 | 1 | 1 | 1 | 0 | 2 | — | — |
| Abrasion resistance evaluation | B | B | B | C | A | C | D | D | D | D | A | A |
| Water resistance evaluation | A | B | A | B | A | C | C | B | B | C | A | A |
| Image quality evaluation | A | A | A | A | A | A | A | A | A | C | D | D |
| Ejection reliability | B | C | B | A | C | A | A | A | A | C | A | A |
| Color development evaluation | A | A | A | A | A | A | A | A | A | C | C | C |
| Gloss evaluation | A | A | A | B | C | A | A | A | A | B | A | A |

3.2.2. Evaluation of Abrasion Resistance

A solid pattern of 20×80 mm was prepared under the printing conditions of the recording test described above and the abrasion resistance was evaluated using a Color Fastness Rubbing Tester AB-301 (trade name, manufactured by Tester Sangyo Co., Ltd.). Specifically, the surface of the recording medium on which the image was recorded was rubbed 30 times to the front and back with a friction element with a white cotton cloth attached (conforming to JIS L 0803) under a load of 300 g. Then, the degree of peeling of the image (coating film) on the surface of the recording medium was visually observed and the abrasion resistance was evaluated according to the following criteria. In the following criteria, A and B are usable.

Evaluation Criteria
A: No peeling of printed surface
B: Peeled area of printed surface is less than 5%
C: Peeled area of printed surface is less than 10%
D: Peeled area of printed surface is 10% or more

3.2.3. Evaluation of Water Resistance

Printed matter was prepared in the same manner as in the recording test 3.2.1., and abrasion resistance was evaluated using a Color Fastness Rubbing Tester AB-301 (trade name, manufactured by Tester Sangyo Co., Ltd.). Specifically, the surface of the recording medium on which the image was recorded was rubbed 10 times to the front and back with a 100 g weight with a white cotton cloth (conforming to JIS L 0803) including water equivalent to the weight. Then, the degree and peeling and bleeding of the image (coating film) on the surface of the recording medium were visually observed and the water resistance was evaluated according to the following criteria. In the following criteria, A and B are usable.

Evaluation Criteria
A: No bleeding or peeling of printed surface
B: No bleeding on printed surface but a peeling area of less than 5%
C: Bleeding on printed surface or a peeling area of 5% or more

3.2.4. Image Quality Evaluation

A solid pattern of 10×10 mm was prepared under the same conditions as the recording test 3.2.1., and the presence or absence of printing unevenness was visually confirmed and evaluated according to the following evaluation criteria.

Evaluation Criteria
A: A state of non-uniform ink density in the solid pattern (unevenness) is not observed
B: Fine unevenness is recognized in the solid pattern
C: Significant unevenness is recognized in the solid pattern
D: A blank portions are recognized in the solid pattern

3.2.5. Evaluation of Ejection Reliability

Recording was performed for 2 hours continuously under the recording conditions of the image quality evaluation 3.2.4. No suction cleaning was done during recording. After recording, it was confirmed how many nozzles from the 360 nozzles were not ejecting and evaluation was carried out according to the following criteria. After the evaluation, suction cleaning was performed, and the ejecting of the non-ejecting nozzle was restored.

Evaluation Criteria
A: No non-ejecting nozzle
B: Number of non-ejecting nozzles is 1 to 10
C: Number of non-ejecting nozzles is 11 or more

3.2.6. Color Development Evaluation

The optical density was measured for the printed matter on which the image quality evaluation 3.2.4. was carried out and evaluated according to the following criteria. For the measurement, an optical densitometer (manufactured by Gretag Macbeth Co., Ltd.) was used.

Evaluation Criteria
A: OD>1.6
B: 1.4<OD≤1.6
C: OD≤1.4

3.2.7. Evaluation of Gloss

The gloss at 60° in the recording portion of the recorded matter obtained in 3.2.4. was measured using a gloss meter (GM-268 Plus, manufactured by Konica Minolta Inc.) and evaluated according to the following evaluation criteria.

Evaluation Criteria

A: 60° gloss of 60 or more
B: 60° gloss of 45 or more and less than 60
C: 60° gloss of less than 45

3.3. Evaluation Results

The results of the evaluation test are shown in Tables 4 to 7.

In the results of the ink storage stability test shown in Table 4, it was confirmed that all of the ink compositions including the polyolefin wax and the resin dispersion and in which the surfactant A is an amount of 7 parts by mass or less with respect to 100 parts by mass of the resin of the resin dispersion and the polyolefin wax were also able to be preferably prepared. Among these, in particular, the ink composition including the surfactant A, was excellent in the storage stability of the ink. In addition, among the ink compositions described above, inks 2, 3, 7, 9 to 13, 20, and 21 in which the ionic surfactant A is 0.2 to 0.5 parts by mass with respect to 1 part by mass of the surfactant A, were particularly excellent in the storage stability of ink as compared with ink compositions which were not.

In the recording tests shown in Tables 5 to 7, in all of Examples, the evaluation of the abrasion resistance was C or higher, the evaluation of the water resistance was B or more, the evaluation of the image quality was C or higher, and the abrasion resistance, water resistance, and image quality were all excellent. On the other hand, in each of the Comparative Examples, any one of the abrasion resistance, water resistance, and image quality was inferior.

In detail, from Examples 2 and 4, it was seen that the abrasion resistance tends to be improved as the average particle size of the wax particles is larger, and it was seen that the ejection reliability and gloss tend to be improved as the average particle size of the wax particles is smaller.

From Examples 2 and 3, there was a tendency for the water resistance and the gloss to be particularly excellent, perhaps because a lower wax melting point helps form the ink coating film sufficiently.

From Examples 7, 6, 9, and 10, it is presumed that, in a case where the ink contains 2-pyrrolidone as an organic solvent, the abrasion resistance is further improved by the dissolution and penetration of the ink on the recording medium.

From Example 6, and the like, it is presumed that as the absolute value of the difference between the surface tension of the ink and the reaction liquid becomes smaller, the image quality evaluation becomes particularly excellent.

From Example 7, it was found that further including another surfactant has a tendency to make the ejection reliability and gloss are particularly excellent.

From Examples 11, 12, and 13, it was found that as the content of the surfactant A becomes smaller, the abrasion resistance becomes particularly excellent and that as the content of the surfactant A becomes larger, the image quality is particularly excellent.

From Examples 14 and 15, it is found that there is a tendency that, as the content of the resin and wax contained in the ink becomes larger, the abrasion resistance becomes particularly excellent, and that, as the content is smaller, the ejection reliability tends to be particularly excellent.

From Example 1 and Examples 17 to 20, in a case where the reaction liquid contains another aggregating agent, excellent abrasion resistance, water resistance, and image quality were obtained. In addition, even in a case where a polyvalent metal salt was included as an aggregating agent, the water resistance was somewhat decreased, but the image quality was particularly excellent.

From the comparison of Examples 2, and 23 to 27, it was found that as the temperature of the recording medium at the time of ink attachment becomes higher, the abrasion resistance, water resistance, and image quality evaluation become particularly excellent, and as the temperature becomes lower, the ejection reliability becomes particularly excellent.

From Example 27, as the scanning time becomes shorter, the ejection reliability becomes particularly excellent.

In Comparative Example 4, the content of the surfactant A of the ink exceeded 7 parts by mass with respect to 100 parts by mass of the total of the resin of the emulsion resin and wax, and the water resistance was inferior.

In Comparative Examples 2 to 5, the ink did not include any of the polyolefin wax and the resin dispersion, and the abrasion resistance was inferior.

In Comparative Examples 6 and 7, the reaction liquid was not used, and the image quality was inferior. In Comparative Example 7, the abrasion resistance and water resistance were not inferior compared with Comparative Example 1 although the ink 4 was used. From this, it was found that the invention is particularly useful in that excellent abrasion resistance and water resistance are able to be obtained even in a case of obtaining excellent image quality using a reaction liquid.

As described above, in the examples included within the scope of the invention, recorded matter provided with water resistance and abrasion resistance and excellent in image quality was obtained.

The invention is not limited to the above-described embodiment, and various modifications are possible. For example, the invention includes configurations substantially the same as the configurations described in the embodiments (for example, configurations having the same function, method, and result, or configurations having the same object and effect). In addition, the invention includes configurations in which non-essential parts of the configurations described in the embodiments are replaced. In addition, the invention includes configurations which achieve the same operation and effect as the configurations described in the embodiments, or configurations able to achieve the same object. In addition, the invention includes configurations in which a publicly-known technique is added to the configurations described in the embodiments.

The entire disclosure of Japanese Patent Application No. 2017-058769, filed Mar. 24, 2017 is expressly incorporated by reference herein.

What is claimed is:

1. An aqueous ink composition and a reaction liquid, the aqueous ink composition comprising:
   a polyolefin wax;
   a resin dispersion;
   water; and
   a surfactant A,
   wherein the resin dispersion includes a (meth)acrylic resin in a content of 3% by mass or more with respect to the total mass of the aqueous ink composition,
   a content of one kind or more of the surfactants A, which are surfactants having a molecular weight of less than 10,000 and which are selected from the group consisting of an ionic surfactant and a nonionic surfactant, the nonionic surfactant being selected from the group consisting of ethers of polyalkylene oxide, higher aliphatic acid esters, and higher aliphatic amides, is 7 parts by mass or less when a total content of the resin of the resin dispersion and the polyolefin wax is 100 parts by mass, and the aqueous ink composition is used in a recording method including attaching the reaction liquid, which contains an aggregating agent for aggregating components of an aqueous ink composition, to a recording medium.

2. The aqueous ink composition according to claim 1, wherein, when the total content of the resin of the resin dispersion and the polyolefin wax is 100 parts by mass, a content of the surfactant A is 0.5 parts by mass or more and 6 parts by mass or less.

3. The aqueous ink composition according to claim 1, wherein the ionic surfactant and the nonionic surfactant are included as the surfactant A.

4. The aqueous ink composition according to claim 1, wherein the surfactant A includes at least one kind selected from the group consisting of a carboxylate, an organic sulfonate, an organic sulfate, and an organic phosphate as the ionic surfactant.

5. The aqueous ink composition according to claim 1, wherein the polyolefin wax has a melting point of 85° C. or higher and 200° C. or lower.

6. The aqueous ink composition according to claim 1, wherein the polyolefin wax has a mass average particle size of 50 nm or more and 600 nm or less according to a light scattering method.

7. The aqueous ink composition according to claim 1, further comprising:
a surfactant other than the surfactant A.

8. The aqueous ink composition according to claim 1, further comprising:
a cyclic amide compound as an organic solvent.

9. The aqueous ink composition according to claim 1, wherein an absolute value of a difference in surface tension between the aqueous ink composition and the reaction liquid is 15 mN/m or less.

10. The aqueous ink composition according to claim 1, wherein a content of an organic solvent having a standard boiling point of higher than 280° C. is 3% by mass or less.

11. The aqueous ink composition according to claim 1, wherein the reaction liquid is at least one kind selected from the group consisting of a polyvalent metal salt, a cationic compound, and organic acid as an aggregating agent.

12. The aqueous ink composition according to claim 1, which is used for recording on a recording medium with a low ink absorbing property or a recording medium with an ink non-absorbing property.

13. The aqueous ink composition and reaction liquid according to claim 1,
wherein the content of the (meth)acrylic resin of the resin dispersion is 3% to 15% by mass with respect to the total mass of the aqueous ink composition.

14. The aqueous ink composition and reaction liquid according to claim 1, further comprising a cyclic amide compound as an organic solvent,
wherein a content of the cyclic amide compound is 15% by mass or more with respect to the total mass of the aqueous ink composition.

15. An ink jet recording method using the aqueous ink composition and the reaction liquid according to claim 1, the method comprising:
attaching the reaction liquid to a recording medium; and
attaching the aqueous ink composition to the recording medium by an ink jet method.

16. The ink jet recording method according to claim 15, further comprising:
heating the recording medium by a heating mechanism,
wherein the attaching of the aqueous ink composition is attaching the aqueous ink composition to a recording medium heated in the heating.

17. The ink jet recording method according to claim 15, wherein the attaching of the aqueous ink composition is performed by performing a plurality of scans in which the ink composition is ejected and attached to a recording medium while changing a position of an ink jet head relative to the recording medium, and
a time during which the ink jet head faces the recording medium in one scan is 12 seconds or shorter.

18. An ink jet recording apparatus comprising:
an ink jet head,
wherein the ink jet recording apparatus performs the ink jet recording method according to claim 15.

19. The ink jet recording apparatus according to claim 18, further comprising:
a mechanism for discharging ink from an ink jet head which is other than a pressure generating unit that ejects an ink composition provided in an ink jet head to carry out recording,
wherein control is performed in which the ink jet recording method is performed for one hour or longer without performing cleaning performed using the mechanism.

20. The aqueous ink composition and reaction liquid according to claim 16,
wherein the surface temperature of the recording medium at the time of the attaching the aqueous ink composition is 32° C. to 50° C.

21. The aqueous ink composition and reaction liquid according to claim 17,
wherein a time during which the ink jet head faces the recording medium in one scan is 1 to 12 seconds.

* * * * *